US012667982B2

(12) United States Patent　　　　(10) Patent No.:　　US 12,667,982 B2
Powell et al.　　　　　　　　　　　(45) Date of Patent:　　　Jun. 30, 2026

(54) SYSTEMS AND METHODS FOR LIFTING DEFORMABLE OBJECTS

(71) Applicant: Cryovac, LLC, Charlotte, NC (US)

(72) Inventors: Bradley Keith Powell, York, SC (US); Roger Jeffrey Anderson, Mooresville, NC (US)

(73) Assignee: Cryovac, LLC, Charlotte, NC (US)

( * ) Notice: Subject to any disclaimer, the term of this patent is extended or adjusted under 35 U.S.C. 154(b) by 1027 days.

(21) Appl. No.: 17/791,055

(22) PCT Filed: Jan. 5, 2021

(86) PCT No.: PCT/US2021/012130
　　　§ 371 (c)(1),
　　　(2) Date: Jul. 6, 2022

(87) PCT Pub. No.: WO2021/141868
　　　PCT Pub. Date: Jul. 15, 2021

(65) Prior Publication Data
　　　US 2023/0020113 A1　　Jan. 19, 2023

Related U.S. Application Data

(60) Provisional application No. 62/958,334, filed on Jan. 8, 2020.

(51) Int. Cl.
　　　*B25J 15/10*　　　　(2006.01)
　　　*B25J 11/00*　　　　(2006.01)
　　　*B25J 15/00*　　　　(2006.01)
(52) U.S. Cl.
　　　CPC ........... *B25J 15/10* (2013.01); *B25J 11/0045* (2013.01); *B25J 15/0028* (2013.01)

(58) Field of Classification Search
　　　CPC .... B25J 15/10; B25J 15/0028; B25J 15/0286; B25J 15/086; B25J 15/0014; B25J 11/0045
　　　See application file for complete search history.

(56) References Cited

U.S. PATENT DOCUMENTS 8,408,618 B2 * 4/2013 Unmuth ................. B25J 15/106
　　　　　　　　　　　　　　　　　294/99.1
9,075,031 B2 * 7/2015 Jones ................... B25J 15/0028
　　　　　　　(Continued)

FOREIGN PATENT DOCUMENTS

DE　　　102015003633 A1　10/2016
DE　　　102015122392 A1　 6/2017
WO　　　　201928242 A1　 2/2019

*Primary Examiner* — Stephen A Vu
(74) *Attorney, Agent, or Firm* — Jason R. Womer

(57)　　　　ABSTRACT

A system for lifting a deformable object includes a support structure, two pairs of opposing arms coupled to the support structure, and a fluid power driver operatively coupled in parallel to the pairs of opposing arms via a fluid power system. Each of the arms includes inclined surfaces configured to contact the deformable object. When the support structure is positioned above the deformable object on the surface, the fluid power driver is configured to increase pressure in the fluid power system until the pressure in the fluid power system reaches a predetermined level such that (i) each of the pairs of opposing arms independently closes a distance until the inclined surfaces are in contact with sides of the deformable object, and (ii) the pairs of opposing arms exert a compressive force on the deformable object that causes the deformable object to slide up one or more of the inclined surfaces.

20 Claims, 23 Drawing Sheets

(56) References Cited

U.S. PATENT DOCUMENTS

| | | | |
|---|---|---|---|
| 9,744,675 B1 * | 8/2017 | Hsieh | B25J 15/0028 |
| 11,745,297 B2 * | 9/2023 | Chae | B25J 9/14 |
| | | | 294/106 |
| 11,780,100 B2 * | 10/2023 | Gu | B25J 19/0029 |
| | | | 294/119.3 |
| 2009/0317221 A1 | 12/2009 | Hawes | |
| 2012/0086226 A1 | 4/2012 | Weber | |
| 2016/0375590 A1 | 12/2016 | Lessing et al. | |
| 2017/0203443 A1 | 7/2017 | Lessing et al. | |
| 2018/0311829 A1 | 11/2018 | Curhan et al. | |
| 2019/0039838 A1 | 2/2019 | Curhan | |
| 2019/0099897 A1 | 4/2019 | Lessing et al. | |

* cited by examiner

100

100

100

100

100

100

SYSTEMS AND METHODS FOR LIFTING DEFORMABLE OBJECTS

BACKGROUND

The present disclosure is in the technical field of lifting deformable objects, such as raw meat products, from surfaces. More particularly, the present disclosure is directed to systems and methods of lifting raw meat products using a system that includes pairs of opposing inclined surfaces that are coupled to a fluid power driver in parallel so that each pair of included surfaces independently moves into contact with the deformable object and lifts the object.

Deformable objects can be difficult to move using electromechanical tools. The deformable nature of the objects does not lend itself to being grasped by traditional tools, such as pincers or other end-of-arm tools on robotic arms. These difficulties with grasping deformable objects reduce or eliminate the advantages of reliability and repeatability of electromechanical tools.

The difficulties with moving deformable objects are compounded when the deformable objects are raw meat products, such as raw beef cuts. Raw meat products come in a large range of sizes and a broad range of weights, making it difficult for a single tool to be able to properly move all types of raw meat products. The manner and force of grasping raw meat products can also damage the raw meat products. In addition, any portion of the tool that contacts raw meat products must be capable of proper cleaning to comply with food and safety regulations. This concern makes complex grasping tools challenging for grasping raw meat products.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a system is usable to lift a deformable object from a surface. The system includes a support structure and first, second, third, and fourth arms coupled to the support structure. The first and second arms define a first pair of opposing arms and the third and fourth arms define a second pair of opposing arms. The system further includes the first, second, third, and fourth inclined surfaces located, respectively, on the first, second, third, and fourth arms. Each of the first, second, third, and fourth inclined surfaces is configured to contact the deformable object. The system further includes a fluid power driver operatively coupled in parallel to the first and second pairs of opposing arms via a fluid power system. When the support structure is positioned above the deformable object on the surface, the fluid power driver is configured to increase pressure in the fluid power system until the pressure in the fluid power system reaches a predetermined level such that (i) each of the first and second pairs of opposing arms independently closes a distance until the first and third inclined surfaces are in contact with a first side of the deformable object and the second and fourth inclined surfaces are in contact with a second side of the deformable object, and (ii) the first and second pairs of opposing arms exert a compressive force on the deformable object that causes the deformable object to slide up one or more of the first, second, third, and fourth inclined surfaces to lift the deformable object off of the surface.

In a second embodiment, each of the first and second pairs of opposing arms of the first embodiments is center-justified such that movement of the first arm toward or away from the second arm causes a corresponding movement of the second arm toward or away from the first arm and the third arm toward or away from the fourth arm causes a corresponding movement of the fourth arm toward or away from the third arm.

In a third embodiment, the system of the second embodiment further includes a first belt coupled between the first and second arms and a second belt coupled between the third and fourth arms. The first and second belts are coupled to the fluid power system to cause corresponding movements of the first and second pairs of opposing arms.

In a fourth embodiment, each of the first, second, third, and fourth inclined surfaces of any of the preceding embodiments includes a flexible sheet material.

In a fifth embodiment, the flexible sheet material of each of the first, second, third, and fourth inclined surfaces of the fourth embodiment is fixedly coupled to a rigid inclined surface on a distal end of each of the first, second, third, and fourth arms.

In a sixth embodiment, each of the first, second, third, and fourth inclined surfaces of any of the preceding embodiments is a rigid surface.

In a seventh embodiment, the first, second, third, and fourth arms of any of the preceding embodiments include first, second, third, and fourth fingers, the first, second, third, and fourth fingers rotatably coupled, respectively, to distal ends of the first, second, third, and fourth arms. The first, second, third, and fourth fingers include, respectively, the first, second, third, and fourth inclined surfaces.

In an eighth embodiment, the first, second, third, and fourth fingers of the seventh include, respectively, first, second, third, and fourth lateral contact surfaces. The first and third lateral contact surfaces are arranged to contact the first side of the deformable object. The second and fourth lateral contact surfaces are arranged to contact the second side of the deformable object.

In a ninth embodiment, the first, second, third, and fourth lateral contact surfaces of the eighth embodiment are at a fixed angle with respect to the first, second, third, and fourth inclined surfaces, respectively. The first, second, third, and fourth fingers are biased toward a lower rotational position. When the first and second pairs of opposing arms exert a compressive force on the deformable object, contact between the first and third contact surfaces and the first side of the deformable object and contact between the second and fourth contact surfaces and the second side of the deformable object cause the first, second, third, and fourth fingers to be rotated toward a higher rotational position.

In a tenth embodiment, rotation of the first, second, third, and fourth fingers of the ninth embodiment from the lower rotational position toward the higher rotational position causes the first, second, third, and fourth fingers to exert a lifting force on the deformable object.

In an eleventh embodiment, each of the first, second, third, and fourth arms of any of the ninth to tenth embodiments includes a biasing mechanism configured to bias the first, second, third, and fourth fingers to the lower rotational position.

In a twelfth embodiment, each of the first, second, third, and fourth fingers of any of the ninth to eleventh embodiments is removably coupled, respectively, to the distal ends of the first, second, third, and fourth arms via a pin, and wherein the each of the first, second, third, and fourth fingers is configured to rotate about the pin in order to rotate about a respective one of the first, second, third, and fourth arms.

In a thirteenth embodiment, the system of any of the preceding embodiments further includes fifth and sixth arms coupled to the support structure. The fifth and sixth arms define a third pair of opposing arms. The system further includes fifth and sixth inclined surfaces located, respectively, on the fifth and sixth arms. Each of the fifth and sixth inclined surfaces is configured to contact the deformable object. The fluid power driver is operatively coupled in parallel to the first, second, and third pairs of opposing arms via the fluid power system. When the fluid power driver increases the pressure in the fluid power system until the pressure in the fluid power system reaches the predetermined level such that (i) the third pair of opposing arms independently closes a distance until the fifth inclined surface is in contact with the first side of the deformable object and the sixth inclined surfaces is in contact with the second side of the deformable object, and (ii) the third pair of opposing arms exerts a compressive force on the deformable object that causes the deformable object to slide up one or more of the fifth and sixth inclined surfaces to lift the deformable object off of the surface.

In a fourteenth embodiment, the fifth and sixth arms of the thirteenth embodiment comprise fifth and sixth fingers, the fifth and sixth fingers rotatably coupled, respectively, to distal ends of the fifth and sixth arms. The fifth and sixth fingers include, respectively, the fifth and sixth inclined surfaces.

In a fifteenth embodiment, the fifth and sixth fingers of the fourteenth embodiment include, respectively, fifth and sixth lateral contact surfaces. The fifth lateral contact surface is arranged to contact the first side of the deformable object. The sixth lateral contact surface is arranged to contact the second side of the deformable object.

In a sixteenth embodiment, the fifth and sixth lateral contact surfaces of the fifteenth embodiment are at a fixed angle with respect to the fifth and sixth inclined surfaces, respectively. The fifth and sixth fingers are biased toward a lower rotational position. When the third pair of opposing arms exerts a compressive force on the deformable object, contact between the fifth contact surface and the first side of the deformable object and contact between the sixth contact surface and the second side of the deformable object cause the fifth and sixth fingers to be rotated toward a higher rotational position.

In a seventeenth embodiment, rotation of the fifth and sixth fingers of the sixteenth embodiment from the lower rotational position toward the higher rotational position causes the fifth and sixth fingers to exert a lifting force on the deformable object.

In an eighteenth embodiment, the fluid power driver of any of the preceding embodiments is a pneumatic cylinder and the fluid power system is a gas power system.

In a nineteenth embodiment, a system is usable to lift a deformable object from a surface. The system includes a support structure, a first arm structure and a second arm structure, and a plurality of first inclined surfaces coupled to the first arm structure. The first inclined surfaces in the plurality of first inclined surface are configured to contact a first side of the deformable object. The system further includes a plurality of second inclined surfaces coupled to the second arm structure. The second inclined surfaces in the plurality of second inclined surface are configured to contact a second side of the deformable object. The system further includes a fluid power driver operatively coupled in parallel to the plurality of first inclined surfaces and the plurality of first inclined surfaces via a fluid power system. When the support structure is positioned above the deformable object on the surface, the fluid power driver is configured to increase pressure in the fluid power system until the pressure in the fluid power system reaches a predetermined level such that (i) each of the first inclined surfaces in the plurality of first inclined surface independently move a distance until the first inclined surfaces in the plurality of first inclined surface are in contact with the first side of the deformable object and the second inclined surfaces in the plurality of second inclined surface independently move a distance until the second inclined surfaces in the plurality of second inclined surface are in contact with the second side of the deformable object, and (ii) the plurality of first inclined surface and the plurality of second inclined surface exert a compressive force on the deformable object that causes the deformable object to slide up one or more of the first and second inclined surfaces to lift the deformable object off of the surface.

In a twentieth embodiment, a method can be performed to lift a deformable object from a surface. The method includes positioning a support structure and a deformable object with respect to each other such that the support structure is above the deformable object. The support structure is coupled to first, second, third, and fourth arms. The first and second arms define a first pair of opposing arms and the third and fourth arms define a second pair of opposing arms. The support structure is coupled to first, second, third, and fourth inclined surfaces located, respectively, on the first, second, third, and fourth arms. Each of the first, second, third, and fourth inclined surfaces is configured to contact the deformable object. The support structure is coupled to a fluid power driver operatively coupled in parallel to the first and second pairs of opposing arms via a fluid power system. When the support structure is positioned above the deformable object on the surface, increasing, by the fluid power driver, pressure in the fluid power system until the pressure in the fluid power system reaches a predetermined level such that (i) each of the first and second pairs of opposing arms independently closes a distance until the first and third inclined surfaces are in contact with a first side of the deformable object and the second and fourth inclined surfaces are in contact with a second side of the deformable object, and (ii) the first and second pairs of opposing arms exert a compressive force on the deformable object that causes the deformable object to slide up one or more of the first, second, third, and fourth inclined surfaces to lift the deformable object off of the surface.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
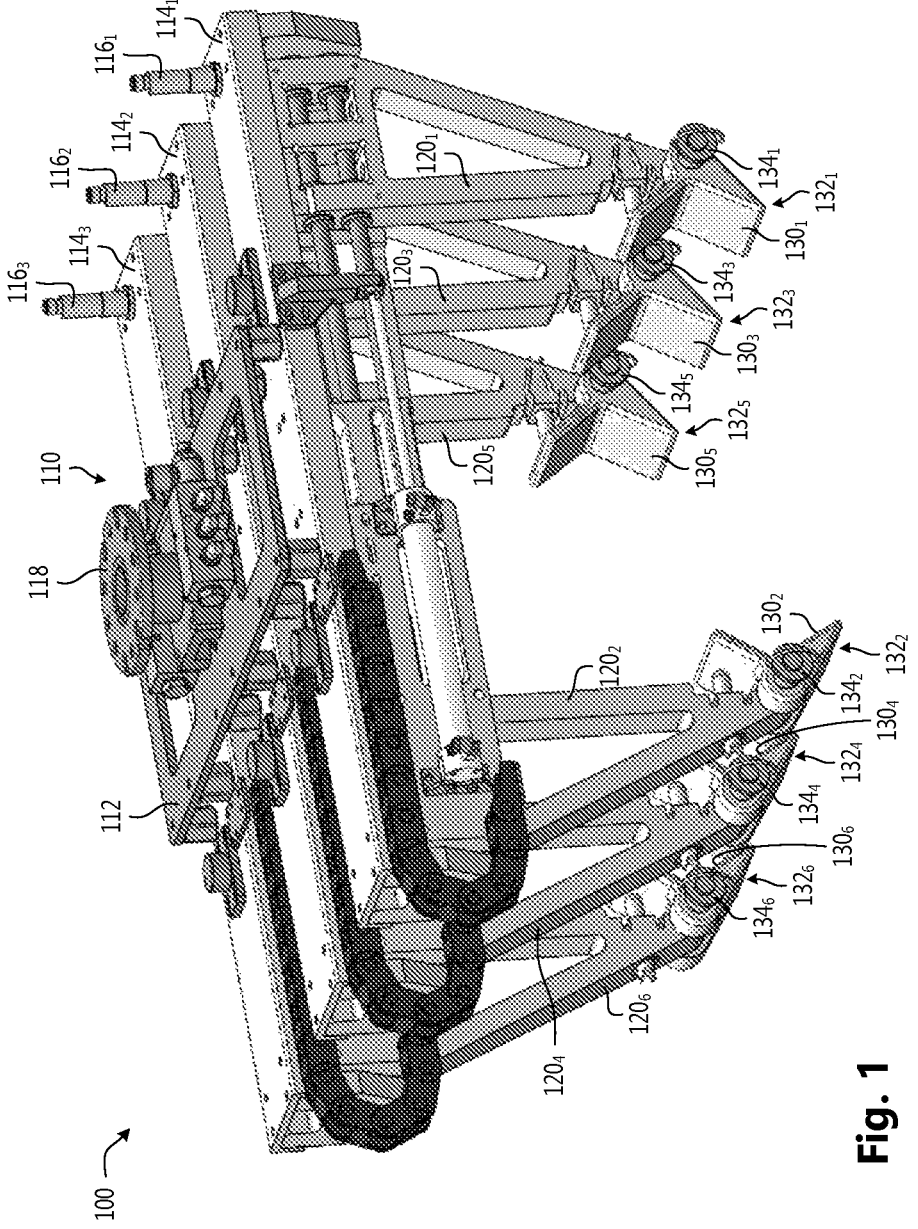
FIG. 1 depicts an embodiment of a system for lifting a deformable object off of a surface, in accordance with the embodiments described herein.

FIG. 1 depicts an embodiment of a system 100 for lifting a deformable object off of a surface. The system 100 includes a support structure 110. In the depicted embodiment, the support structure 110 includes a frame 112. The frame 112 is coupled to brackets $114_1$, $114_2$, $114_3$ (collectively, brackets 114). Each of the brackets 114 is configured to hold a pair of opposing arms, as discussed in greater detail below. The support structure further includes ports $116_1$, $116_2$, $116_3$ (collectively, ports 116) located respectively on the brackets $114_1$, $114_2$, $114_3$. The ports 116 are configured to be coupled in parallel to a fluid power system (e.g., a pneumatic system or a hydraulic system). The system 100 is configured to move the arms coupled to the brackets 114 by changing the pressure in the fluid power system, as discussed in greater detail below. In the depicted embodiment, the support structure 110 further includes a coupling mechanism 118 that is coupled to the frame 112. The coupling mechanism 118 is configured to be coupled to a movement device (e.g., a conveyor, a robotic arm, or any other device capable of movement) in order to couple the system 100 to the movement device.

The system 100 also includes arms $120_1$, $120_2$, $120_3$, $120_4$, $120_5$, $120_6$ (collectively, arms 120). The arms $120_1$ and $120_2$ are movably coupled to the bracket $114_1$ and form a pair of opposing arms. The arms $120_1$ and $120_2$ are capable of moving translationally toward and away from each other. In some embodiments, the arms $120_1$ and $120_2$ are biased away from each other by a biasing mechanism (e.g., a compression spring) to the positions shown in FIG. 1. One or both of the arms $120_1$ and $120_2$ can be moved toward the other, such as by increasing the pressure in the fluid power system coupled to the port $116_1$.

Similarly, the arms $120_3$ and $120_4$ are movably coupled to the bracket $114_2$ and form a pair of opposing arms. The arms $120_5$ and $120_6$ are also movably coupled to the bracket $114_2$ and form a pair of opposing arms. The arms $120_3$ and $120_4$ are capable of moving translationally toward and away from each other and the arms $120_5$ and $120_6$ are capable of moving translationally toward and away from each other. In some embodiments, the arms $120_3$ and $120_4$ are biased away from each other by a biasing mechanism and the arms $120_5$ and $120_6$ are biased away from each other by a biasing mechanism to the positions shown in FIG. 1. One or both of the arms $120_3$ and $120_4$ can be moved toward the other, such as by increasing the pressure in the fluid power system coupled to the port $116_2$. One or both of the arms $120_5$ and $120_6$ can be moved toward the other, such as by increasing the pressure in the fluid power system coupled to the port $116_3$.

The system 100 further includes inclined surfaces $130_1$, $130_2$, $130_3$, $130_4$, $130_5$, $130_6$ (collectively, inclined surfaces 130). The inclined surfaces 130 are configured to contact sides of the deformable object as the deformable object is being lifted by the system 100. The inclined surfaces $130_1$, $130_2$, $130_3$, $130_4$, $130_5$, $130_6$ are located on the arms $120_1$, $120_2$, $120_3$, $120_4$, $120_5$, $120_6$, respectively. In the depicted embodiment, the system 100 further includes fingers $132_1$, $132_2$, $132_3$, $132_4$, $132_5$, $132_6$ (collectively, finders 132) that are rotatably coupled to the distal ends of the arms $120_1$, $120_2$, $120_3$, $120_4$, $120_5$, $120_6$, respectively. In this embodiment, the fingers $132_1$, $132_2$, $132_3$, $132_4$, $132_5$, $132_6$ include the inclined surfaces $130_1$, $130_2$, $130_3$, $130_4$, $130_5$, $130_6$, respectively. In the depicted embodiment, the fingers $132_1$, $132_2$, $132_3$, $132_4$, $132_5$, $132_6$ are removably coupled to the distal ends of the arms $120_1$, $120_2$, $120_3$, $120_4$, $120_5$, $120_6$, by pins $134_1$, $134_2$, $134_3$, $134_4$, $134_5$, $134_6$, respectively. The ability to easily (e.g., manually without the aid of tools) remove the fingers 132 from the distal ends of the arms 120 allows the fingers 132 to be quickly removed from the arms 120, such as for cleaning of the fingers 132.

Figure 2:
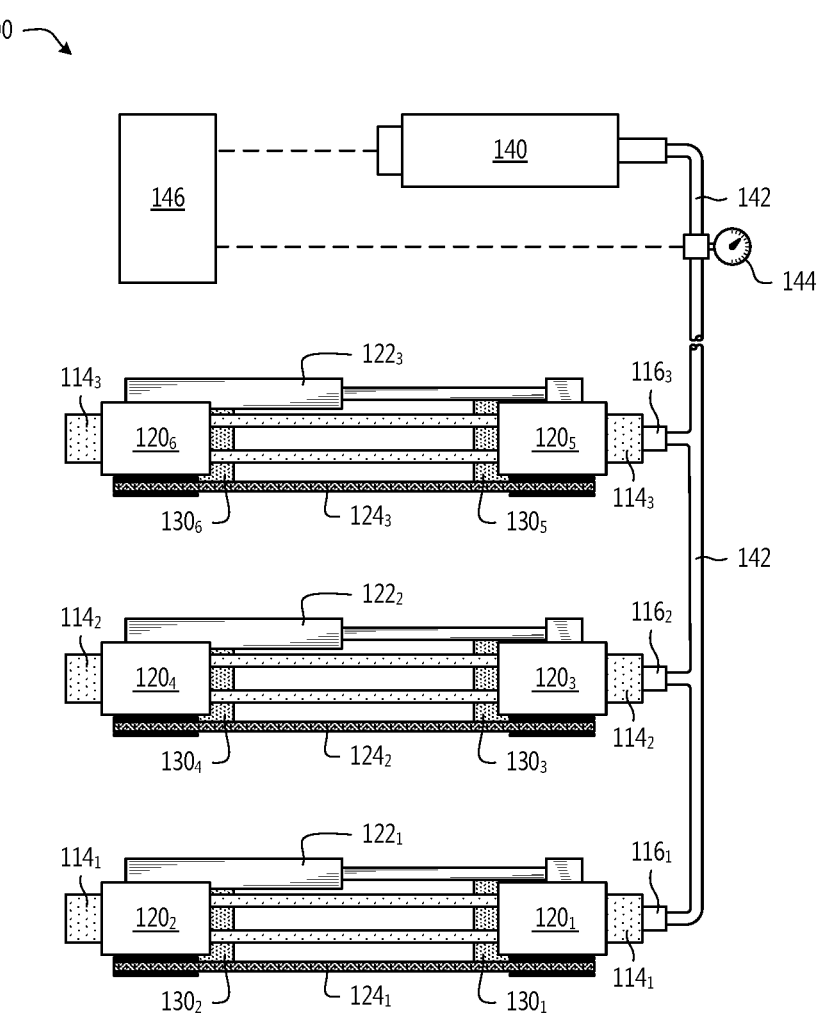
FIG. 2 depicts a partial top view of the system shown in FIG. 1, in accordance with the embodiments described herein.

FIG. 2 depicts a partial top view of the system 100, including portions of the brackets 114, the ports 116, the arms 120, and the inclined surfaces 130. FIG. 2 further depicts that the system 100 includes biasing mechanisms $122_1$, $122_2$, $122_3$ (collectively, biasing mechanisms 122). In the depicted embodiment, the biasing mechanism $122_1$ is configured to bias the arms $120_1$ and $120_2$ away from each other, the biasing mechanism $122_2$ is configured to bias the arms $120_3$ and $120_4$ away from each other, and the biasing mechanism $122_3$ is configured to bias the arms $120_5$ and $120_6$ away from each other. In some embodiments, the biasing mechanisms include one or more of a compression spring, a piston/cylinder mechanism, a Belleville washer stack, or any other biasing mechanism.

FIG. 2 further depicts that the system 100 includes driving mechanisms 124₁, 124₂, 124₃ (collectively, driving mechanisms 124). In the depicted embodiment, the driving mechanism 124₁ is configured to move one or both of the arms 120₁ and 120₂ toward the other, the driving mechanism 124₂ is configured to move one or both of the arms 120₃ and 120₄ toward the other, and the driving mechanism 124₃ is configured to move one or both of the arms 120₅ and 120₆ toward the other. In the depicted embodiment, the driving mechanisms 124 are belt and wheel assemblies, where one of the wheels is driven by the fluid power system. In other embodiments, the driving mechanisms 124 can include one or more of a rack and pinion system, a rope and pully system, or any other mechanism that can move the arms 120 and/or overcome the biasing force of the biasing mechanisms 122.

In the depicted embodiment, the driving mechanisms 124 are configured such that each of the pairs of opposing arms is center-justified. In other words, the driving mechanism 124₁ is configured such that movement of the arm 120₁ toward or away from the arm 120₂ causes a corresponding movement of the arm 120₂ toward or away from the arm 120₁, the driving mechanism 124₂ is configured such that movement of the arm 120₃ toward or away from the arm 120₄ causes a corresponding movement of the arm 120₄ toward or away from the arm 120₃, and the driving mechanism 124₃ is configured such that movement of the arm 120₅ toward or away from the arm 120₆ causes a corresponding movement of the arm 120₆ toward or away from the arm 120₅. In other embodiments, the driving mechanisms 124 can be configured such that each of the pairs of opposing arms is side-justified, where one of the arms in each pair of opposing arms does not move with respect to the support structure.

The system 100 further includes a fluid power driver 140. In some embodiments, the fluid power driver 140 is a gas power cylinder (e.g., a pneumatic cylinder) or a liquid power cylinder (e.g., a hydraulic cylinder). The fluid power driver 140 is coupled to a fluid power system 142. In some embodiments, the fluid power system 142 is a gas fluid power system (e.g., a pneumatic system) or a liquid power system (e.g., a hydraulic system). In some embodiments, the fluid power system 142 includes conduits (e.g., tubing, piping, etc.) that hold a fluid, such as a gas or a liquid. The fluid power driver 140 is configured to increase or decrease the pressure of the fluid in the fluid power system 142.

The fluid power system 142 is coupled to each of the ports 116 in parallel. The ports 116 are coupled to the respective driving mechanisms 124 (e.g., via a pneumatic actuator or a hydraulic actuator) such that an increase in pressure in the fluid power system 142 actuates the driving mechanisms 124 to move the pairs of arms (e.g., in parallel to the pair of arms 120₁ and 120₂, the pair of arms 120₃ and 120₄, and the pair of arms 120₅ and 120₆) in the system 100. In this way, the fluid power system 142 couples the fluid power driver 140 to the pairs of arms in the system 100 in parallel. Thus, when the fluid power driver 140 increases pressure in the fluid power system 142, the increase in pressure is applied substantially equally to each of the pairs of arms in the system 100. The advantages of coupling the fluid power driver 140 in parallel to the pairs of arms in the system 100 are discussed in greater detail below.

FIG. 2 further depicts that the system 100 includes a pressure sensor 144 and a computing device 146. The pressure sensor 144 is configured to measure pressure in the fluid power system 142. In the depicted embodiment, the pressure sensor 144 is located along the fluid power system 142 separately from the fluid power driver 140. In other embodiments, the pressure sensor 144 can be integrated with the fluid power driver 140. The computing device 146 (e.g., a controller) is communicatively coupled to the fluid power driver 140 and the pressure sensor 144. The computing device 146 is configured to control the fluid power driver 140 based on the pressure measured by the pressure sensor 144. For example, the computing device 146 can control the fluid power driver 140 to increase the pressure in the fluid power system 142 until the pressure measured by the pressure sensor 144 reaches a predetermined level. In the depicted embodiment, the computing device 146 is external of the fluid power driver 140 and the pressure sensor 144. In other embodiments, the computing device 146 can be integrated with one or both of the fluid power driver 140 and the pressure sensor 144.

Figure 3A:
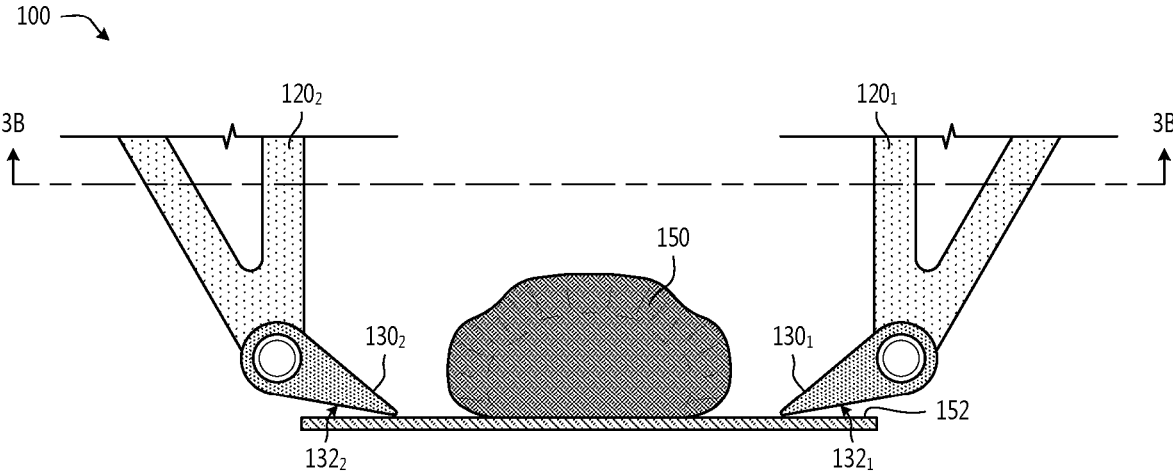
FIGS. 3A and 3B depict a partial front view and a top cross-sectional view, respectively, of a first instance of a method of using the system shown in FIGS. 1 and 2 to lift a deformable object from a surface, in accordance with the embodiments described herein.
Figure 3B:
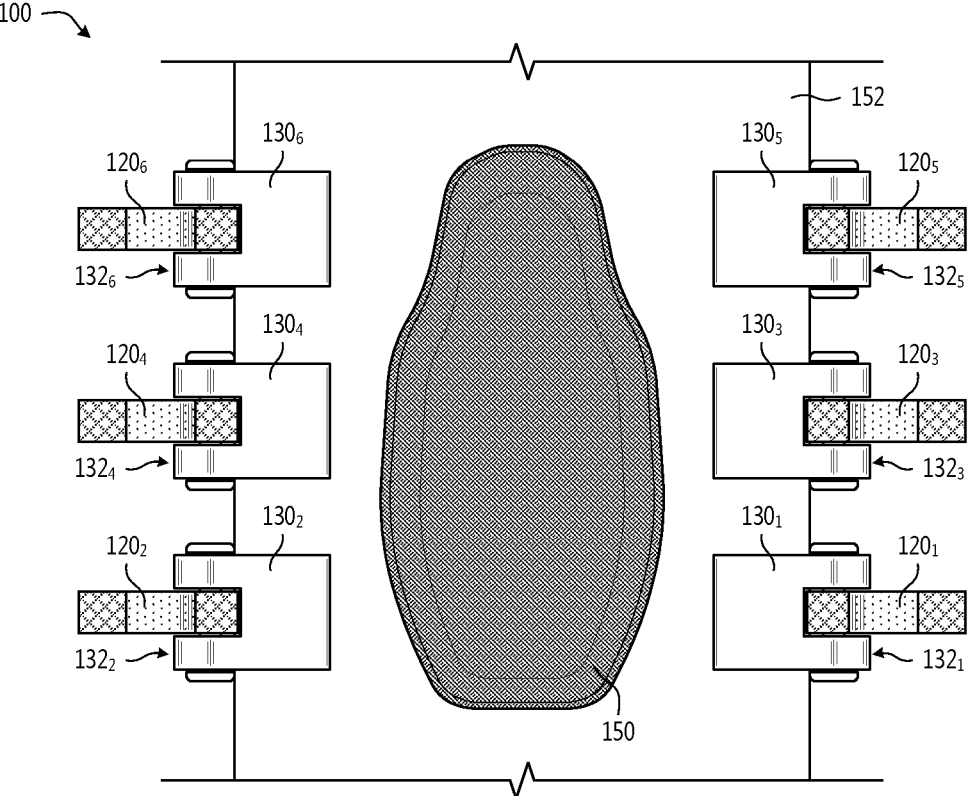
Figure 4A:
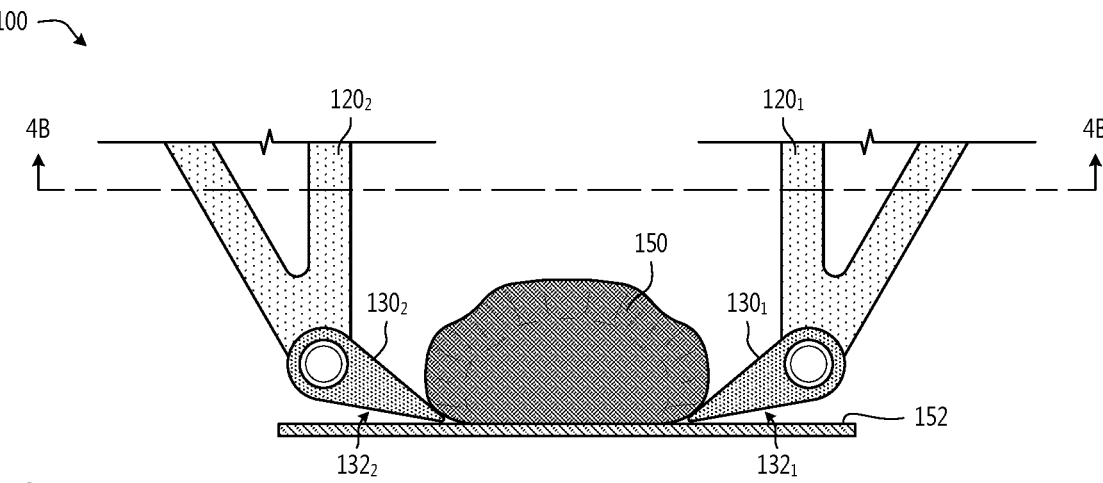
FIGS. 4A and 4B depict a partial front view and a top cross-sectional view, respectively, of a second instance of the method that started in FIGS. 3A and 3B, in accordance with the embodiments described herein.
Figure 4B:
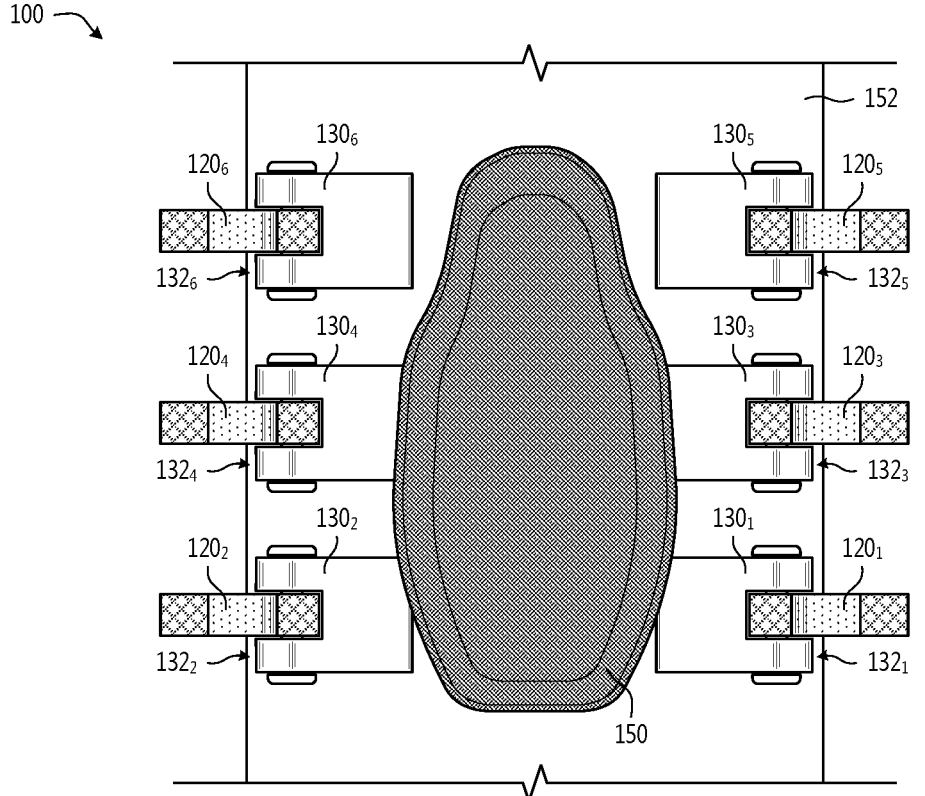
Figure 5A:
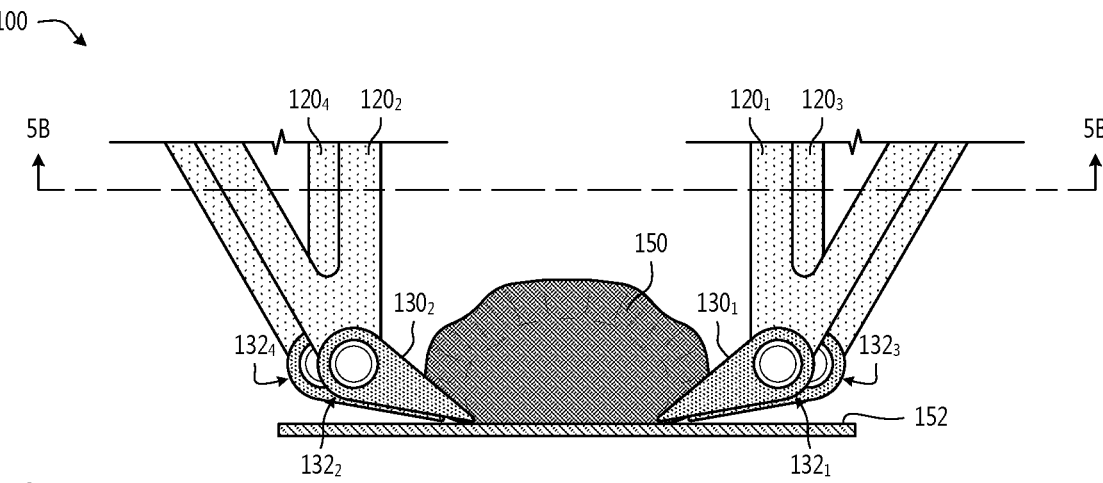
FIGS. 5A and 5B depict a partial front view and a top cross-sectional view, respectively, of a third instance of the method that started in FIGS. 3A and 3B, in accordance with the embodiments described herein.
Figure 5B:
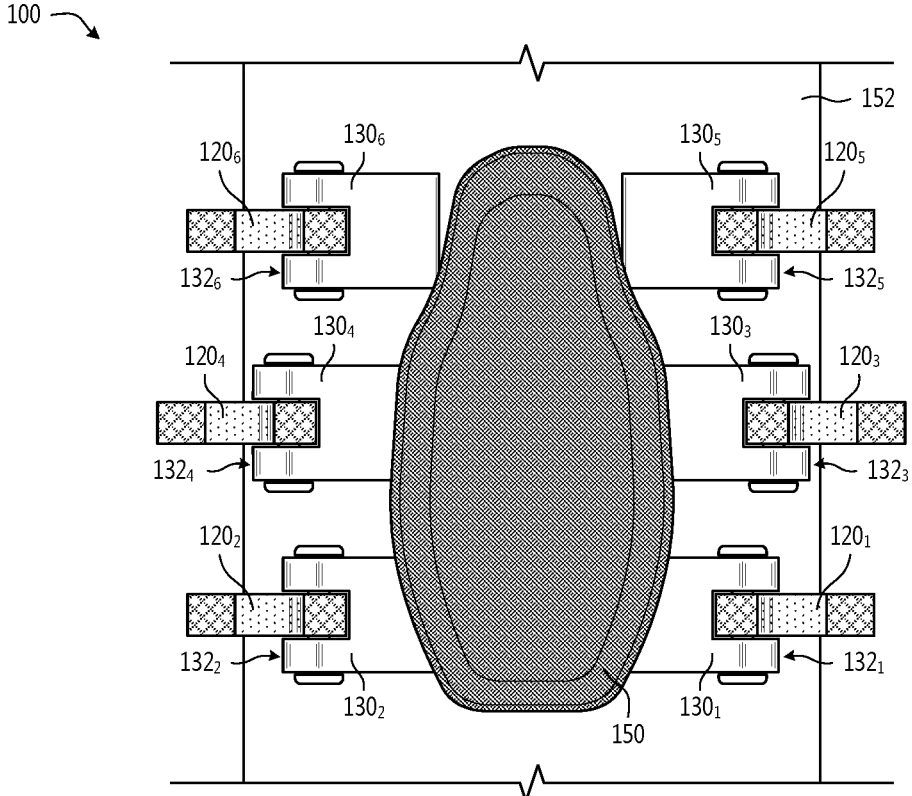
Figure 6A:
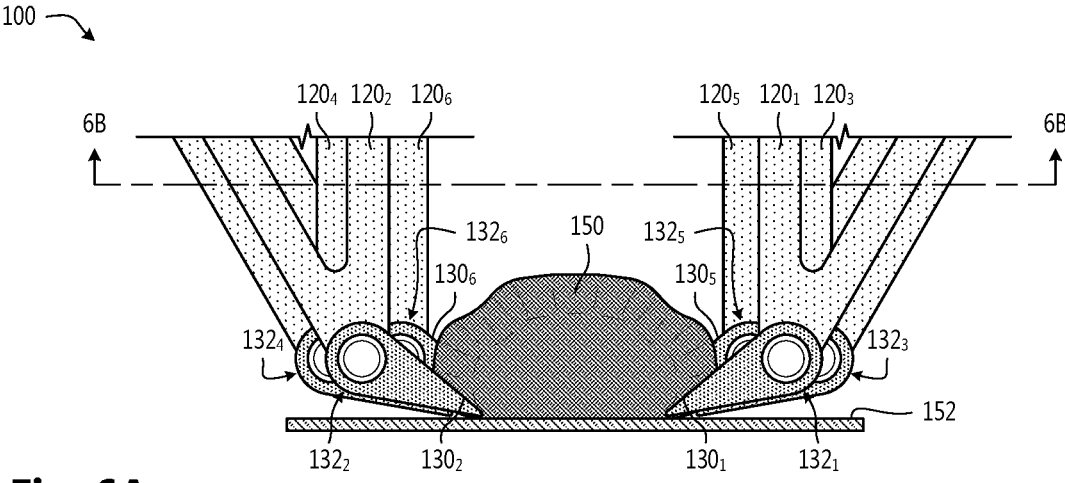
FIGS. 6A and 6B depict a partial front view and a top cross-sectional view, respectively, of a fourth instance of the method that started in FIGS. 3A and 3B, in accordance with the embodiments described herein.
Figure 6B:
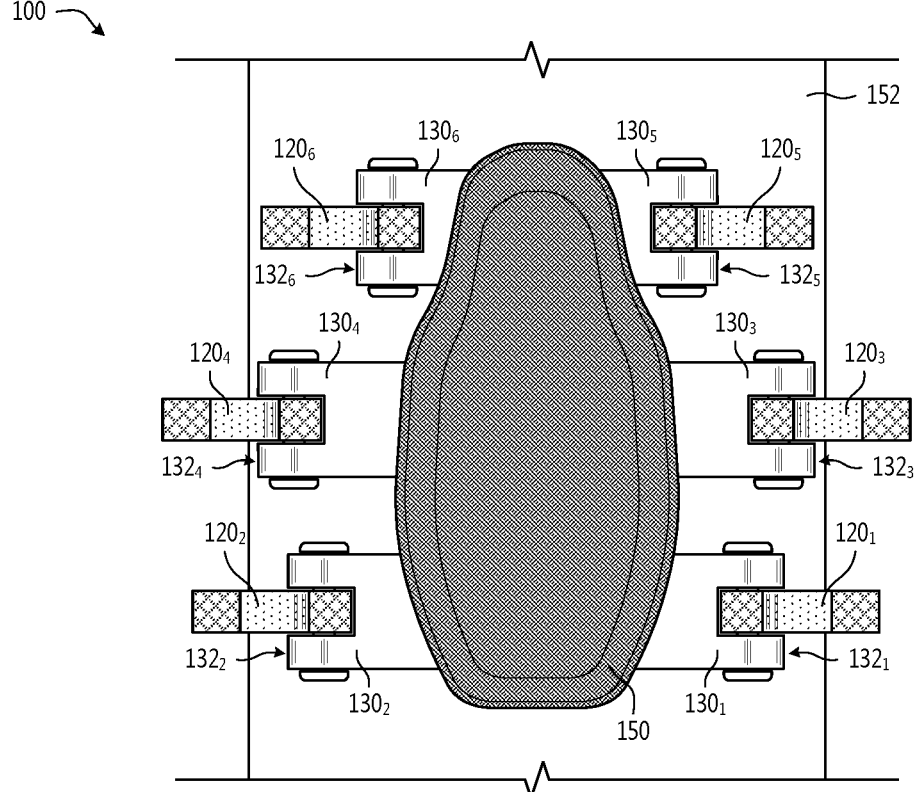
Figure 7A:
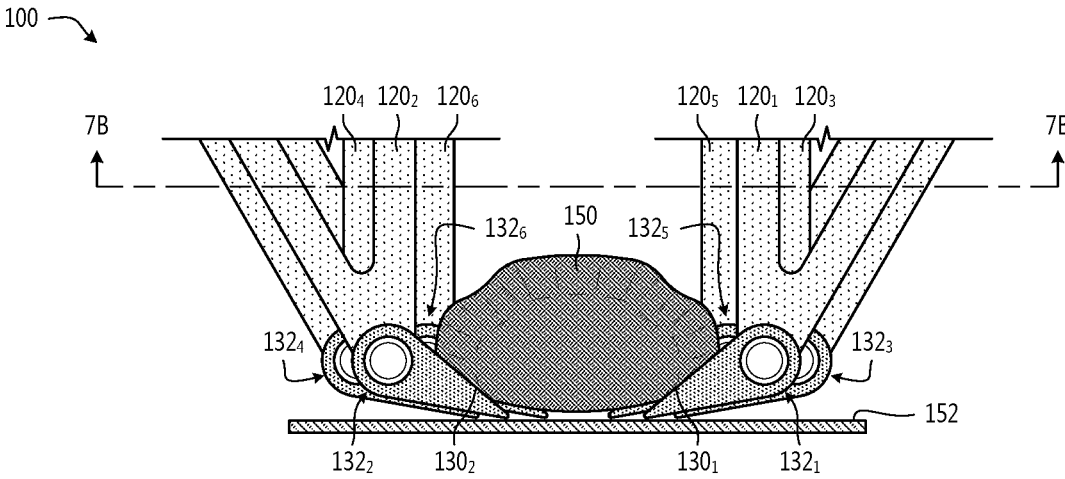
FIGS. 7A and 7B depict a partial front view and a top cross-sectional view, respectively, of a fifth instance of the method that started in FIGS. 3A and 3B, in accordance with the embodiments described herein.
Figure 7B:
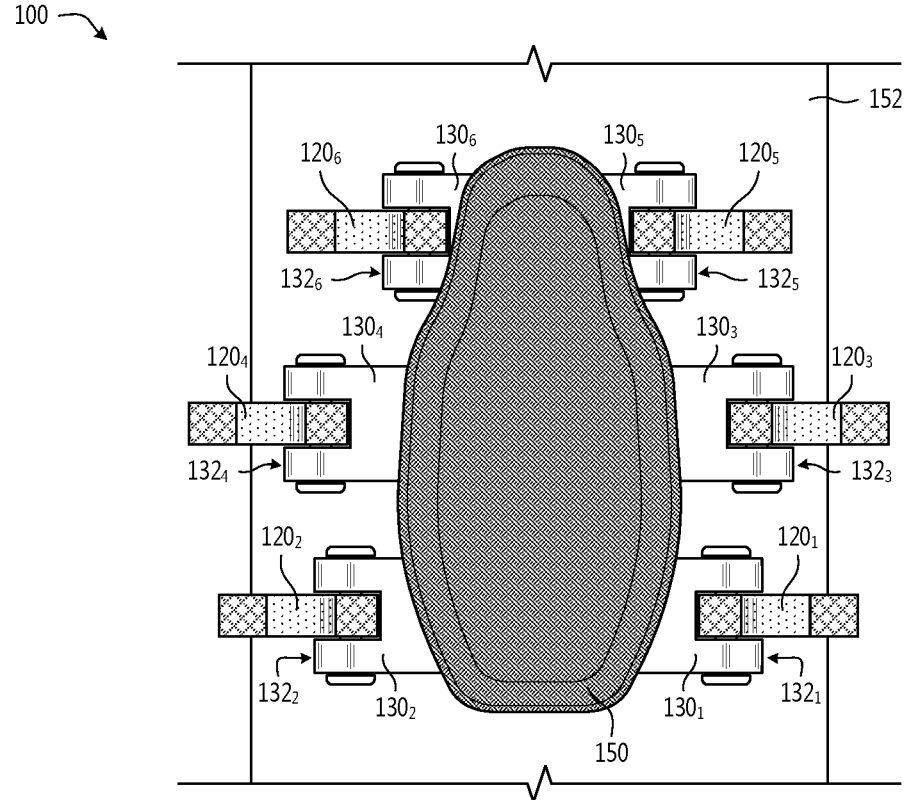
Figure 8A:
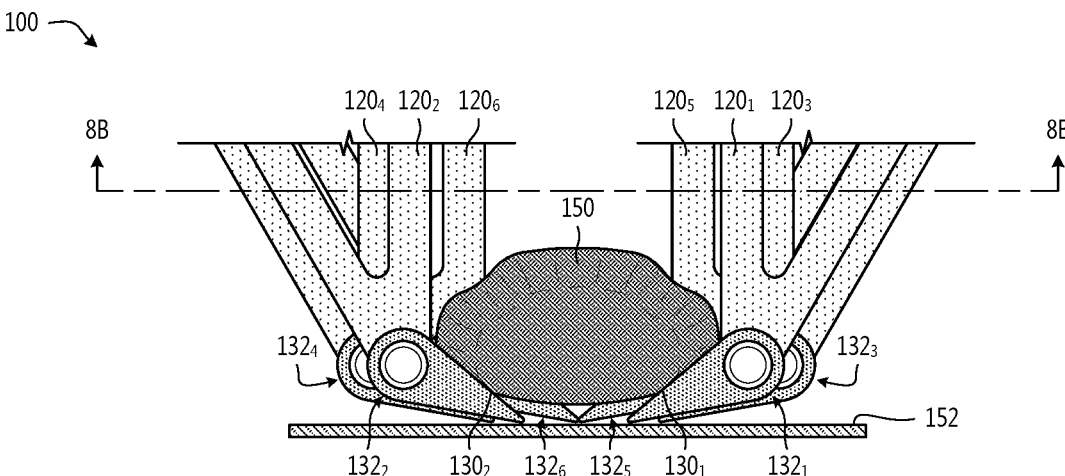
FIGS. 8A and 8B depict a partial front view and a top cross-sectional view, respectively, of a sixth instance of the method that started in FIGS. 3A and 3B, in accordance with the embodiments described herein.
Figure 8B:
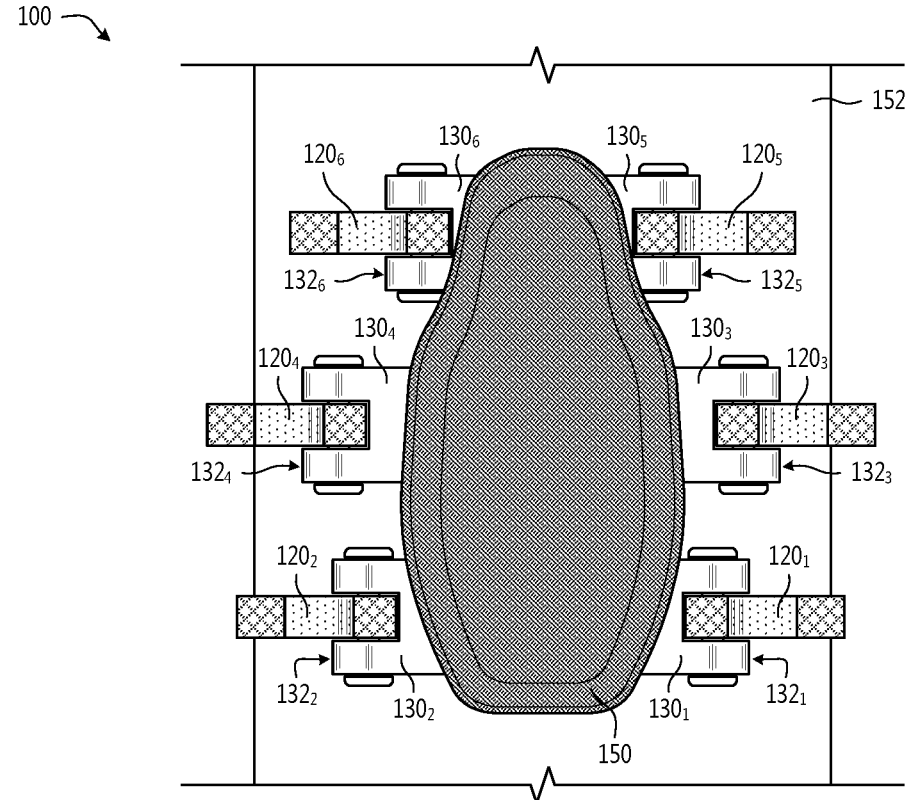

The system 100 can be used to lift a deformable object from a surface. Depicted in FIGS. 3A to 8B is an embodiment of a method of the system 100 being used to lift a deformable object 150 from a surface 152. More specifically, FIGS. 3A and 3B depict a partial front view and a top cross-sectional view, respectively, of a first instance of the method; FIGS. 4A and 4B depict a partial front view and a top cross-sectional view, respectively, of a second instance of the method; FIGS. 5A and 5B depict a partial front view and a top cross-sectional view, respectively, of a third instance of the method; FIGS. 6A and 6B depict a partial front view and a top cross-sectional view, respectively, of a fourth instance of the method; FIGS. 7A and 7B depict a partial front view and a top cross-sectional view, respectively, of a fifth instance of the method; and FIGS. 8A and 8B depict a partial front view and a top cross-sectional view, respectively, of a sixth instance of the method. In some embodiments, the deformable object 150 can be a food product, such as a piece of raw meat, a vacuum-sealed piece of raw meat, a piece of fresh product, or any other type of food product. In some embodiments, the surface 152 can be a conveyor belt, a table top, a shelf, or any other type of surface.

In the first instance shown in FIGS. 3A and 3B, the deformable object 150 is on the surface 152 and the system 100 is oriented such that the one of the arms 120 in each of the pairs of opposing arms is on either side of the deformable object 150. In some embodiments, the system 100 is coupled to the end of a robotic arm and the robotic arm is configured to position the system 100 with respect to the object 150 as shown in FIGS. 3A and 3B. In the depicted first instance, the arms 120 in each of the pairs of opposing arms are biased away from each other by the biasing mechanisms 122 as far as the support structure 110 allows. The fluid power driver 140 has not increased the pressure in the fluid power system 142 to a level that would cause the driving mechanisms 124 to exert a greater force on the arms 120 than the force exerted on the arms 120 by the biasing mechanisms 122.

The fluid power driver 140 can increase the pressure in the fluid power system 142 from the first instance shown in FIGS. 3A and 3B until the pressure reaches a predetermined level. In the depicted embodiment, the pressure in the fluid power system 142 is increased by the fluid power driver 140 after the first instance shown in FIGS. 3A and 3B until the sixth instance shown in FIGS. 8A and 8B. Each of the second through sixth instances in FIGS. 4A to 8B shows a level of pressure in the fluid power system 142 that is greater than the previous instance. In the sixth instance shown in FIGS. 8A and 8B, the pressure in the fluid power system 142 has reached the predetermined level.

From the first instance shown in FIGS. 3A and 3B to the second instance shown in FIGS. 4A and 4B, the fluid power driver 140 has increased the pressure in the fluid power system 142 to cause the pairs of opposing arms to move toward each other. In particular, the arm $120_1$ and the arm $120_2$ have moved toward each other, the arm $120_3$ and the arm $120_4$ have moved toward each other, and the arm $120_5$ and the arm $120_6$ have moved toward each other. Because the pairs of opposing arms are coupled to the fluid power driver 140 in parallel and there is substantially the same resistance between each of the pairs of arms before the second instance, the arms $120_1$, $120_3$, and $120_5$ tend to move substantially the same distance between the first and second instances and the arms $120_2$, $120_4$, and $120_6$ tend to move substantially the same distance between the first and second instances. At the second instance shown in FIGS. 4A and 4B, the inclined surfaces $130_3$ and $130_4$ of the arms $120_3$ and $120_4$ have come into contact with the right and left sides, respectively, of the deformable object 150. The deformable object 150 is not perfectly straight along the right and left sides, leaving the inclined surfaces $130_1$, $130_2$, $130_5$, and $130_6$ of the arms $120_1$, $120_2$, $120_5$, and $120_6$ not in contact with the deformable object 150.

From the second instance shown in FIGS. 4A and 4B to the third instance shown in FIGS. 5A and 5B, the fluid power driver 140 has increased the pressure in the fluid power system 142. The resistance to the movement of the arms $120_3$ and $120_4$ due to the contact between the arms $120_3$ and $120_4$ and the deformable object 150 is much higher than the resistance to the movement of the arms $120_1$ and $120_2$ and the arms $120_5$ and $120_6$ from the air. Because the pair of arms $120_1$ and $120_2$, the pair of arms $120_3$ and $120_4$, and the pair of arms $120_5$ and $120_6$ are coupled to the fluid power driver 140 in parallel, the increase in pressure in the fluid power system 142 from the second instance to the third instance causes the arms $120_1$ and $120_2$ and the arms $120_5$ and $120_6$ to continue moving toward each other. Because the pair of opposing arms $120_1$ and $120_2$ and the pair of opposing arms $120_5$ and $120_6$ are coupled to the fluid power driver 140 in parallel, the arms $120_1$ and $120_5$ tend to move substantially the same distance between the second and third instances and the arms $120_2$ and $120_6$ tend to move substantially the same distance between the second and third instances. At the third instance shown in FIGS. 5A and 5B, the inclined surfaces $130_1$ and $130_2$ of the arms $120_1$ and $120_2$ have come into contact with the right and left sides, respectively, of the deformable object 150. The deformable object 150 is not perfectly straight along the right and left sides, leaving the inclined surfaces $130_5$ and $130_6$ of the arms $120_5$ and $120_6$ not in contact with the deformable object 150.

From the third instance shown in FIGS. 5A and 5B to the fourth instance shown in FIGS. 6A and 6B, the fluid power driver 140 has increased the pressure in the fluid power system 142. The resistance to the movement of the arms $120_1$ and $120_2$ and the arms $120_3$ and $120_4$ from the deformable object 150 is much higher than the resistance to the movement of the arms $120_5$ and $120_6$ from the air. Because the pair of arms $120_1$ and $120_2$, the pair of arms $120_3$ and $120_4$, and the pair of arms $120_5$ and $120_6$ are coupled to the fluid power driver 140 in parallel, the increase in pressure in the fluid power system 142 from the third instance to the fourth instance causes the arms $120_5$ and $120_6$ to continue moving toward each other. At the fourth instance shown in FIGS. 6A and 6B, the inclined surfaces $130_1$ and $130_2$ of the arms $120_1$ and $120_2$ have come into contact with the right and left sides, respectively, of the deformable object 150. The deformable object 150 is not perfectly straight along the right and left sides, leaving the inclined surfaces $130_5$ and $130_6$ of the arms $120_5$ and $120_6$ not in contact with the deformable object 150.

From the fourth instance shown in FIGS. 6A and 6B to the fifth instance shown in FIGS. 7A and 7B, the fluid power driver 140 has increased the pressure in the fluid power system 142. Because all of the inclined surfaces 130 were in contact with the deformable object 150 at the fourth instance, the increase in pressure in the fluid power system 142 from the fourth instance to the fifth instance caused the arms 120 to exert a compressive force on the deformable object 150. The compressive force exerted by the arms 120 on the deformable object 150 causes the deformable object 150 to slide up the inclined surfaces 130 and lift the deformable object 150 off of the surface 152.

From the fifth instance shown in FIGS. 7A and 7B to the sixth instance shown in FIGS. 8A and 8B, the fluid power driver 140 has increased the pressure in the fluid power system 142 to the predetermined pressure. The increase in pressure in the fluid power system 142 from the fifth instance to the sixth instance caused the arms 120 to further exert a compressive force on the deformable object 150. The compressive force exerted by the arms 120 on the deformable object 150 causes the deformable object 150 to further slide up the inclined surfaces 130 and lift the deformable object 150 farther from the surface 152. In some embodiments, the predetermined pressure is selected based on one or more of a desired amount of compressive force to be applied by the arms 120 on the deformable object 150, a desired height that the deformable object 150 is lifted from the surface 152, or any other desired result of the movement of the arms 120.

The embodiment of the method depicted in FIGS. 3A to 8B shows some of the benefits of the system 100 where the fluid power driver 140 is coupled in parallel to the pair of opposing arms $120_1$ and $120_2$, the pair of opposing arms $120_3$ and $120_4$, and the pair of opposing arms $120_5$ and $120_6$. One of the benefits is that each of the pairs of opposing arms is able to close a different distance around the deformable object 150 while being driven at substantially the same force in the direction of travel. In the depicted example, the pair of opposing arms $120_3$ and $120_4$ moved toward each other the least amount until the inclined surfaces $130_3$ and $130_4$ contacted the deformable object 150, the pair of opposing arms $120_1$ and $120_2$ moved toward each other a greater amount until the inclined surfaces $130_1$ and $130_2$ contacted the deformable object 150, and the pair of opposing arms $120_5$ and $120_6$ moved toward each other the greatest amount until the inclined surfaces $130_5$ and $130_6$ contacted the deformable object 150. In other embodiments, where the deformable object 150 has a different size and/or shape, each of the pairs of opposing arms can close a different length based on the size and/or shape of the deformable object 150. Where the system 100 is used to pick up many different deformable objects that have different shapes and/or sizes, the closing of the pairs of opposing arms conforms to the shape and/or size of each of the deformable objects.

Another benefit of the system 100 is that the arms 120 are able to reliably and stably lift the deformable object 150. If the arms $120_1$, $120_3$, and $120_5$ were required to move in unison and the arms $120_2$, $120_4$, and $120_6$ were required to move in unison, the result would be an unstable lift of the deformable object 150. For example, after the inclined surfaces $130_3$ and $130_4$ initially contacted the deformable object 150 (e.g., at the second instance shown in FIGS. 4A and 4B), the continued movement of the arms $120_1$, $120_3$, and $120_5$ toward the deformable object 150 and the continued movement of the arms $120_2$, $120_4$, and $120_6$ toward the deformable object 150 would cause the inclined surfaces $130_3$ and $130_4$ would exert a lifting force near the middle of the deformable object 150 before the inclined surfaces $130_1$, $130_2$, $130_5$, and $130_6$ are in contact with the deformable object 150. The result would be instability of the deformable object 150 as it is lifted by the inclined surfaces $130_3$ and $130_4$ before being supported by the inclined surfaces $130_1$, $130_2$, $130_5$, and $130_6$. In such an unstable lift, the deformable object 150 could teeter and/or fall from the system 100, potentially damaging the deformable object 150 and/or the system 100. In contrast, the coupling of the pairs of opposing arms 120 in the system 100 allows each of the inclined surfaces 130 to be in contact with the deformable object 150 before a significant lifting force is applied by any of the arms 120. Then, when all of the inclined surfaces 130 are in contact with the deformable object 150, all of the inclined surfaces 130 provide a lifting force to reliably and stably lift the deformable object 150 from the surface 152.

Another benefit of the system 100 is that the arms 120 can conform to a unique shape and/or size of a deformable object without any portion of the feedback system located on the arms 120. As can be seen in FIG. 2, the pressure sensor 144 and the computing device 146 can be located remotely from the arms 120. In some embodiments the pressure sensor 144 and/or the computing device 146 can be integrated with the fluid power driver 140, which itself can be located remotely from the arms 120. In this system, there is no need to measure an amount of force exerted by each of the arms 120, to measure the distance traveled by each of the arms 120, to determine whether each of the arms 120 has come into contact with the deformable object 150, and the like. All of the functions of the arms 120 can be passively controlled (i.e., controlled without direct measurement of any of the aspect of the arms) by controlling the fluid power driver 140 based on the pressure measured in the fluid power system 142. In the case where the system 100 is used to lift deformable food products (e.g., cuts of raw meat), any portion of the system 100 that can come into contact with the deformable food products must be cleaned and/or replaced on a regular basis. Not having extra equipment on the arms 120, such as feedback sensors, actuators, and the like, greatly reduces the number of pieces of the system 100 that are subject to cleaning and/or replacement due to potential contact with food products.

The embodiment of the system 100 includes three pairs of opposing arms 120. It will be apparent that the system 100 could have any plurality of pairs of opposing arms, such as two pair of opposing arms, four pairs of opposing arms, or any other number of pairs of opposing arms. In some embodiments, a greater number of pairs of opposing arms may allow the arms to better conform to the shape of a deformable object. However, a greater number of pairs of opposing arms also adds complexity to the system. In some embodiments, a number of pairs of opposing arms—such as three pairs of opposing arms or four pairs of opposing arms—may be selected based on a desired amount of conformity with deformable objects, a desired amount of complexity of the system, and expected size and/or shape of the deformable objects that will be lifted by the system, any other factor, or any combination thereof.

In some embodiments, systems with pairs of opposing arms can have different types of fingers at the end of the arms. In one example, a system with rotatable fingers on the ends of arms is depicted in FIGS. 9A to 9D. In another example, a system of static fingers on the ends of arms is depicted in FIGS. 10A to 110. In yet another example, a system of static fingers with flexible surfaces on the ends of arms is depicted in FIGS. 12A to 13C.

Depicted in FIGS. 9A to 9D is an embodiment of a system 200 that includes an arm $220_1$ and an arm $220_2$ (collectively, arms 220) that form a pair of opposing arms. In some embodiments, the system 200 includes at least a second pair of opposing arms (not visible in FIGS. 9A to 9D) behind the pair of opposing arms 220. In some embodiments, the system 200 further includes a support structure (not visible in FIGS. 9A to 9D) coupled to each of the pairs of opposing arms in the system 200. The system 200 further includes inclined surfaces $230_1$ and $230_2$ (collectively, inclined surfaces 230). The inclined surfaces 230 are configured to contact sides of a deformable object 250 as the deformable object 250 is being lifted from a surface 252 by the system 200. The inclined surfaces $230_1$ and $230_2$ are located on the arms $220_1$ and $220_2$, respectively. In the depicted embodiment, the system 200 further includes fingers $232_1$ and $232_2$ (collectively, fingers 232). In the depicted embodiment, the fingers 232 are rotatably coupled to the distal ends of the arms 220. In the depicted embodiment, the fingers $232_1$ and $232_2$ include the inclined surfaces $230_1$ and $230_2$, respectively. In the depicted embodiment, the fingers $232_1$ and $232_2$ are removably coupled to the distal ends of the arms $220_1$ and $220_2$ by pins $234_1$ and $234_2$, respectively. The ability to easily (e.g., manually without the aid of tools) remove the fingers 232 from the distal ends of the arms 220 allows the fingers 232 to be quickly removed from the arms 220, such as for cleaning of the fingers 232.

In the depicted embodiment, the fingers $232_1$ and $232_2$ further include lateral contact surfaces $236_1$ and $236_2$ (collectively, lateral contact surfaces 236), respectively. In embodiments wherein the system 200 further includes at least one other pair of opposing arms, the fingers of the other pair of opposing arms can further include lateral contact surfaces. The lateral contact surfaces 236 are arranged to contact the sides of the deformable object 250. In particular, the lateral contact surface $236_1$ is arranged to contact the right side of the deformable object 250 and lateral contact surface $236_2$ is arranged to contact the left side of the deformable object 250. In the depicted embodiment, the lateral contact surfaces 236 are at a fixed angle with respect to the inclined surfaces 230. As will be discussed in greater detail below, the contact between the lateral contact surfaces 236 and the deformable object 250 can aid in lifting the deformable object 250 from the surface 252.

Figure 9A:
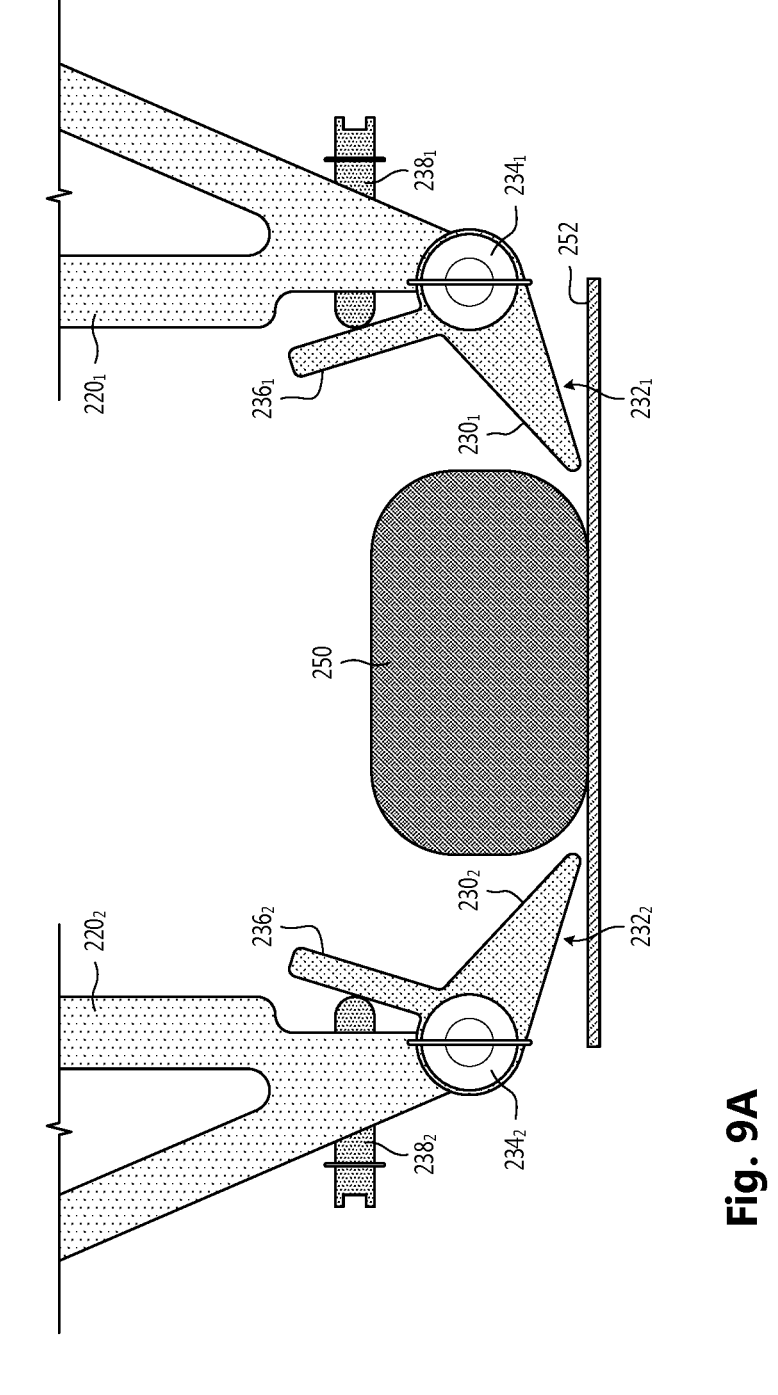
FIGS. 9A to 9D depict an embodiment of a system that includes pairs of opposing arms with rotatable fingers and an embodiment of a method of using that system to lift the deformable object from a surface, in accordance with the embodiments described herein.
Figure 10A:
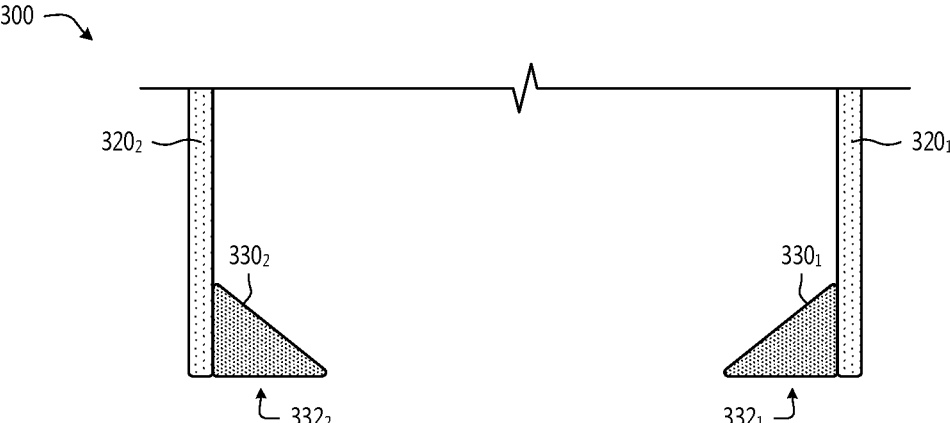
FIGS. 10A and 10B depict partial front and partial perspective views, respectively, of a system that includes static fingers, in accordance with the embodiments described herein.

In the embodiment shown in FIG. 9A, the fingers 232 are rotationally biased toward a lower rotational position. In some embodiments, the fingers 232 can be rotationally biased to the lower rotational position by gravity. In the depicted embodiment, the fingers $232_1$ and $232_2$ are rotationally biased to the lower rotational position by biasing mechanisms $238_1$ and $238_2$ (collectively biasing mechanisms 238), respectively. In particular, the biasing mechanisms $238_1$ is configured to bias the finger $232_1$ counterclockwise to the lower rotational position and the biasing mechanisms $238_2$ is configured to bias the finger $232_2$ clockwise to the lower rotational position. In some embodiments, the fingers 232 are prevented from rotating beyond the lower rotational position due to physical interference with the arms 220. In some embodiments, the biasing mechanisms 238 can be torsional springs, compression springs, spring-loaded pins, or any other type of biasing mechanism. In embodiments wherein the system 200 further includes at least one other pair of opposing arms, the arms of the other pair of opposing arms can further include biasing mechanisms to rotationally bias the fingers of the other pair of opposing arms to the lower rotational position. In the depicted embodiment, each of the biasing mechanisms is fixedly coupled to one of the arms 220 and is configured to contact and exert a force on a back surface opposing one of the lateral contact surfaces 236.

Figure 9B:
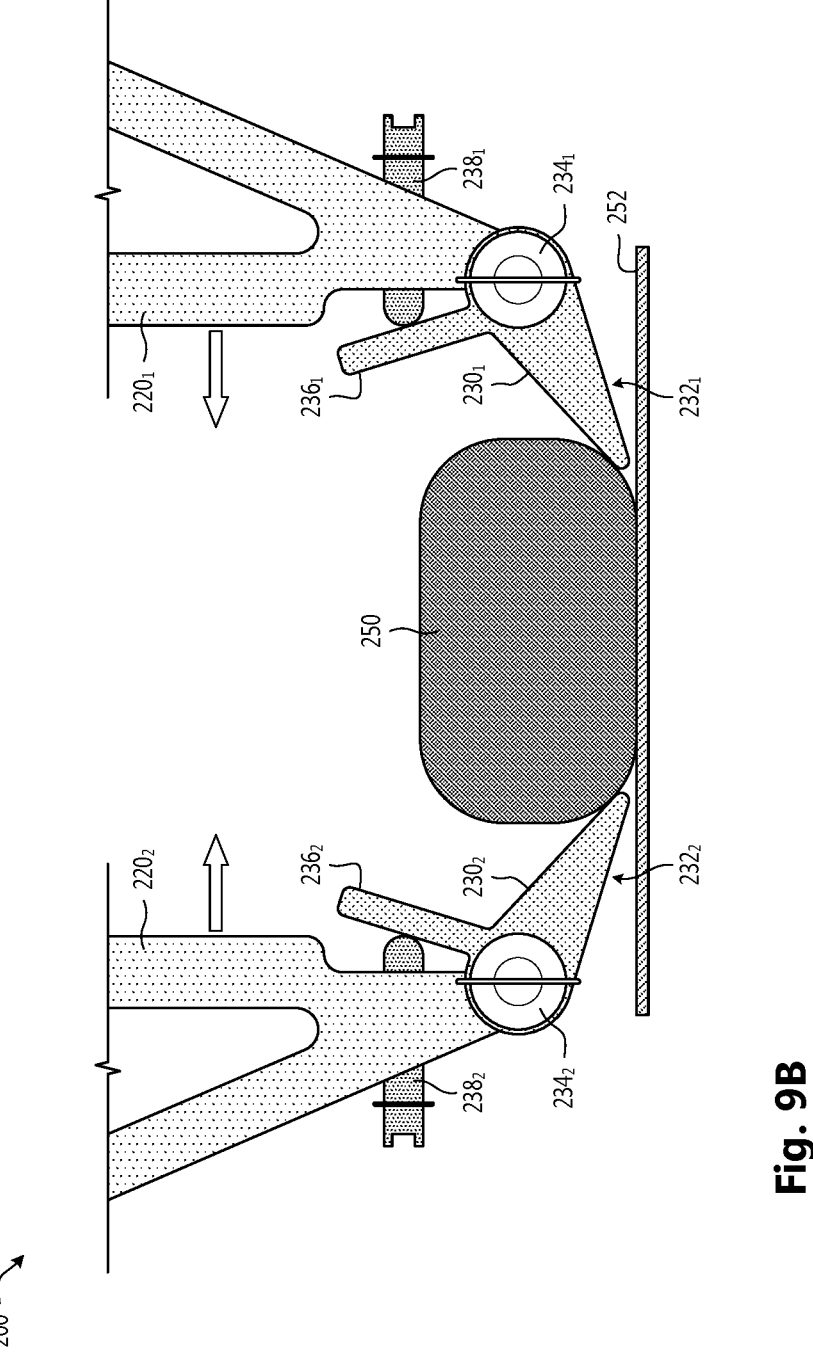

Each of FIGS. 9A to 9D depicts an instance of an embodiment of a method of the system 200 being used to lift the deformable object 250 from the surface 252. In FIG. 9A, the arms 220 are withdrawn from the sides of the deformable object 250 and the fingers 232 are biased toward the lower rotational position. At the instance depicted in FIG. 9A, neither of the fingers $232_1$ and $232_2$ has come into contact with the surface 252. If either or both of the fingers $232_1$ and $232_2$ had come into contact with the surface 252, the fingers 232 can rotate. This ability of the fingers 232 to rotate in response to contact with the surface 252 is particularly helpful if the surface 252 is uneven (e.g., not level), is a compliant material (e.g., a rubber conveyor belt), or other similar non-rigid and/or non-level surface. In FIG. 9B, the arms 220 have been closed until the inclined surfaces 230 have come into contact with the right and left sides of the deformable object 250. In some embodiments, the system 200 includes a fluid power driver operatively coupled in parallel to each of the pairs of opposing arms via a fluid power system, and the arms 220 are closed by the fluid power driver increasing the pressure in the fluid power system. Although not shown in FIGS. 9A to 9D, each of the pairs of opposing arms in the system 200 is coupled in parallel to the fluid power driver so that each of the pairs of arms is capable of closing a different distance until the inclined surfaces 230 are all in contact with the sides of the deformable object 250.

Figure 9C:
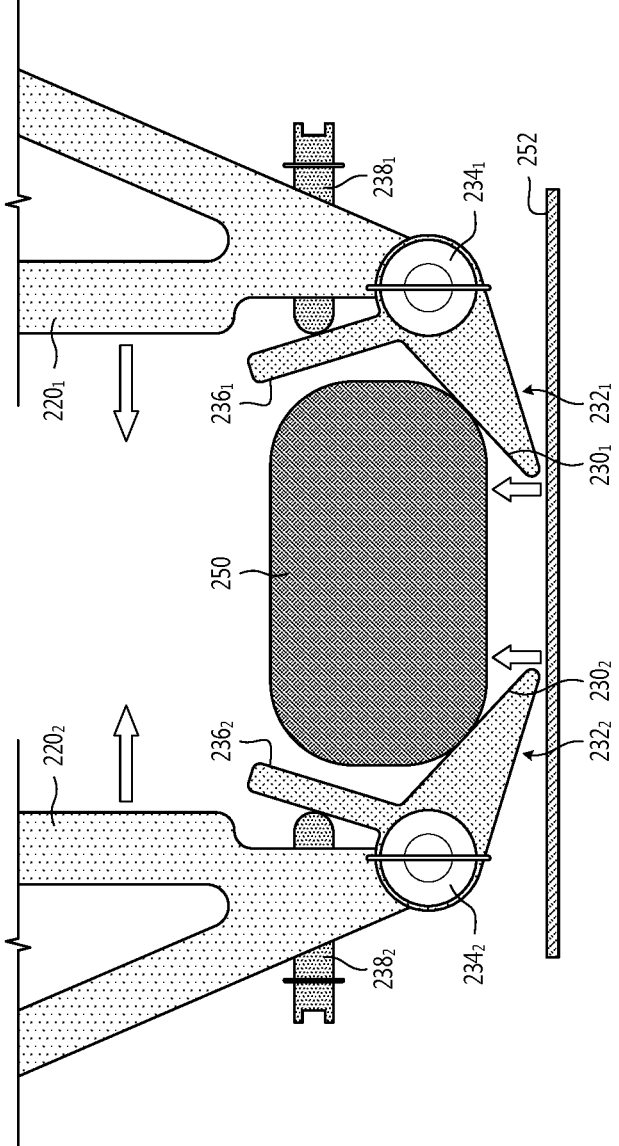

From the instance shown in FIG. 9B to the instance shown in FIG. 9C, the fluid power driver has increased the pressure in the fluid power system. Because all of the inclined surfaces 230 were in contact with the deformable object 250 at the instance shown in FIG. 9B, the increase in pressure in the fluid power system to the instance shown in FIG. 9C caused the arms 220 to exert a compressive force on the deformable object 250. The compressive force exerted by the arms 220 on the deformable object 250 causes the deformable object 250 to slide up the inclined surfaces 230 and lift the deformable object 250 off of the surface 252. At the instance shown in FIG. 9C, the deformable object 250 has not yet come into contact with the lateral contact surfaces 236 of the fingers 232.

Figure 9D:
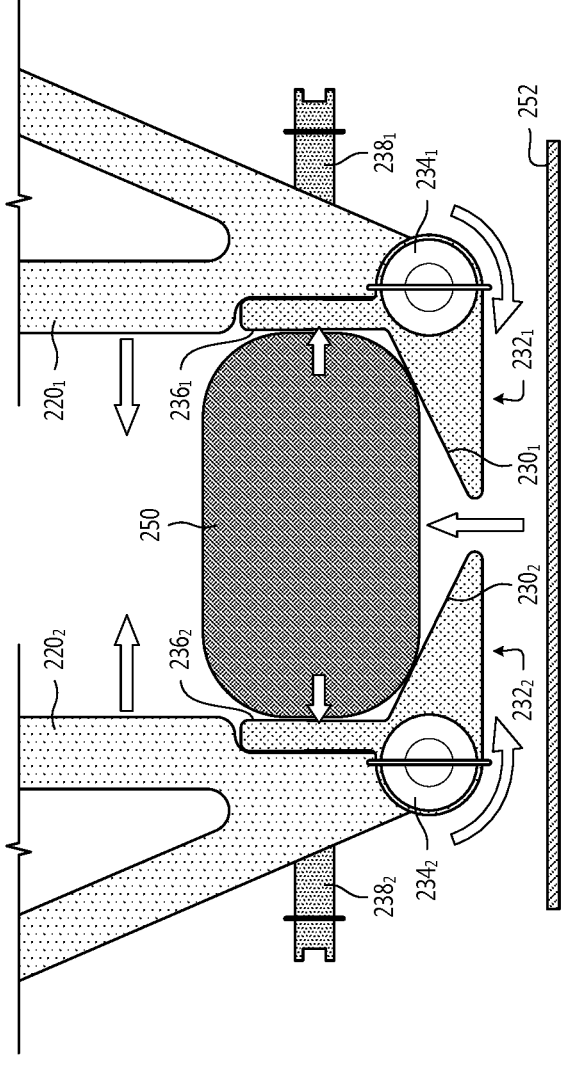

From the instance shown in FIG. 9C to the instance shown in FIG. 9D, the fluid power driver has increased the pressure in the fluid power system to a predetermined pressure. The increased pressure in the fluid power system has caused the arms 220 to further close until the sides of the deformable object 250 have come into contact with the lateral contact surfaces 236 of the fingers 232, which results in the deformable object 250 exerting a force on the lateral contact surfaces 236. The force from the deformable object 250 on the lateral contact surfaces 236 has caused the fingers 232 to counterrotate until the fingers are in the higher rotational position shown in FIG. 9D. The counterrotation of the fingers 232 as caused the inclined surfaces 230 to rotate upward and further lift the deformable object 250 away from the surface 252. In some embodiments, the fingers 232 are prevented from counterrotating beyond the higher rotational position due to physical interference with the arms 220. In some embodiments, the force exerted by the biasing mechanisms 238 (e.g., a spring force of the biasing mechanisms 238) is selected such that the force exerted by the deformable object 250 on the lateral contact surfaces 236 when the pressure in the fluid power system is at the predetermined pressure will overcome the force of the biasing mechanisms 238 to permit the counterrotation of the fingers 232 to the higher rotational position shown in FIG. 9D.

Figure 10B:
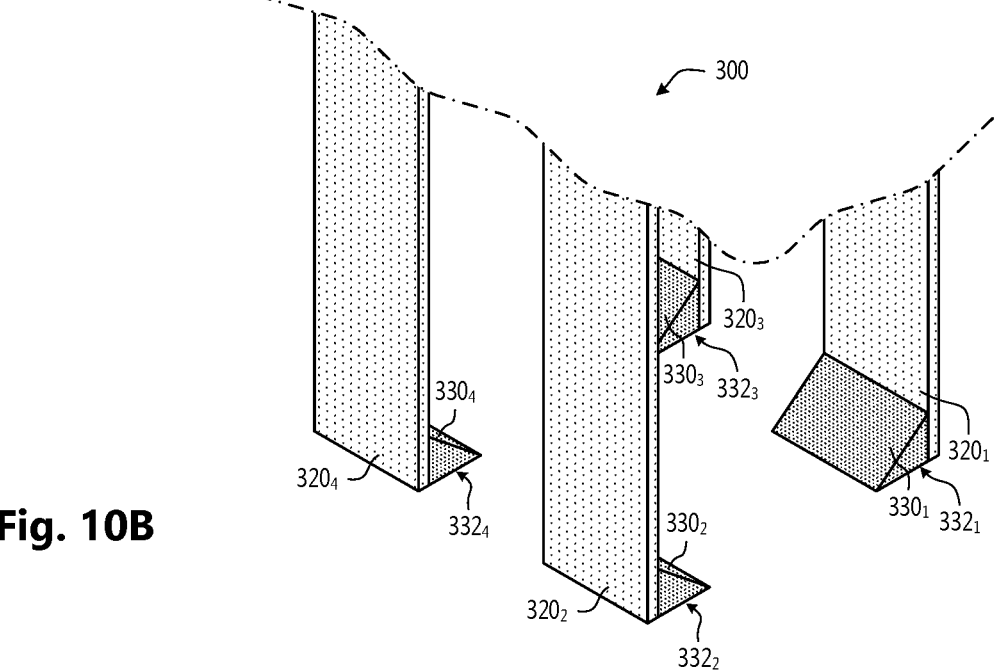

FIGS. 10A and 10B depict partial front and partial perspective views, respectively, of a system 300 that includes static fingers. The system 300 includes arms $320_1$, $320_2$, $320_3$, $320_4$ (collectively, arms 320) that form two pairs of opposing arms. In some embodiments, the system 300 further includes a support structure (not visible in FIGS. 10A to 10B) coupled to each of the pairs of opposing arms 320 in the system 300. The system 300 further includes inclined surfaces $330_1$, $330_2$, $330_3$, $330_4$ (collectively, inclined surfaces 330). The inclined surfaces 330 are configured to contact sides of a deformable object as the system 300 lifts the deformable object from a surface. The inclined surfaces $330_1$, $330_2$, $330_3$, $330_4$ are located on the arms $320_1$, $320_2$, $320_3$, $320_4$, respectively. In the depicted embodiment, the system 300 further includes fingers $332_1$, $332_2$, $332_3$, $332_4$ (collectively, fingers 332). In the depicted embodiment, the fingers 332 are statically coupled to the distal ends of the arms 320. In the depicted embodiment, the fingers $332_1$, $332_2$, $332_3$, $332_4$ include the inclined surfaces $330_1$, $330_2$, $330_3$, $330_4$, respectively.

Figure 11A:
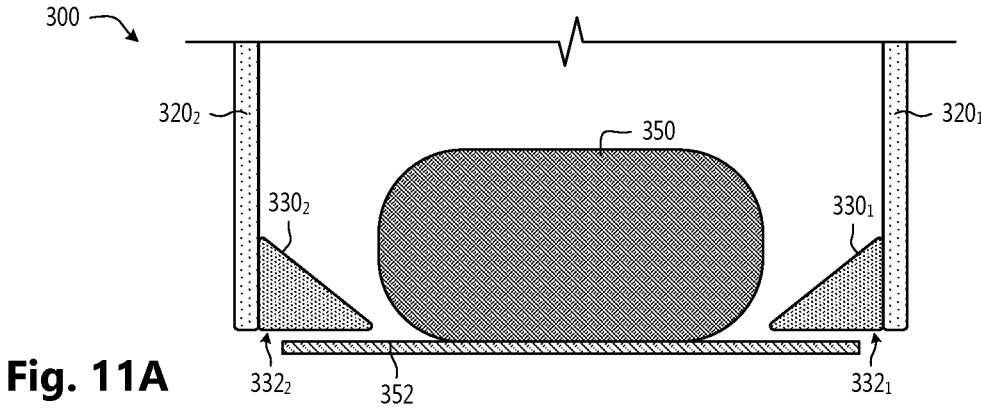
FIGS. 11A to 11O depict instances of an embodiment of a method of using the system shown in FIGS. 10A and 10B to lift a deformable object from a surface, in accordance with the embodiments described herein.
Figure 11B:
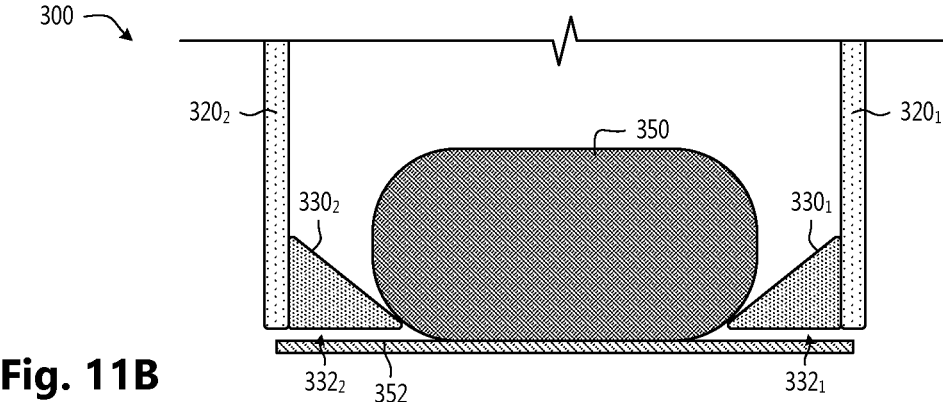

FIGS. 11A to 11O depict instances of an embodiment of a method of the system 300 being used to lift a deformable object 350 from a surface 352. In FIG. 11A, the arms 320 are withdrawn from the sides of the deformable object 350 and the fingers 332 are positioned slightly above the surface 352. In FIG. 11B, the arms 320 have been closed until the inclined surfaces 330 have come into contact with the right and left sides of the deformable object 350. In some embodiments, the system 300 includes a fluid power driver operatively coupled in parallel to each of the pairs of opposing arms via a fluid power system, and the arms 320 are closed by the fluid power driver increasing the pressure in the fluid power system. Although not shown in FIGS. 11A to 11O, each of the pairs of opposing arms in the system 300 is coupled in parallel to the fluid power driver so that each of the pairs of arms is capable of closing a different distance until the inclined surfaces 330 are all in contact with the sides of the deformable object 350.

Figure 11C:
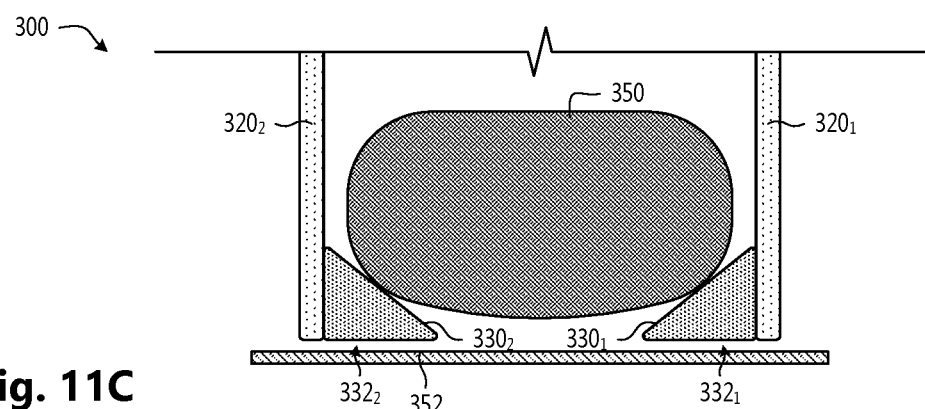

From the instance shown in FIG. 11B to the instance shown in FIG. 11C, the fluid power driver has increased the pressure in the fluid power system (e.g., to a predetermined pressure). Because all of the inclined surfaces 330 were in contact with the deformable object 350 at the instance shown in FIG. 11B, the increase in pressure in the fluid power system to the instance shown in FIG. 11C caused the arms 320 to exert a compressive force on the deformable object 350. The compressive force exerted by the arms 320 on the deformable object 350 causes the deformable object 350 to slide up the inclined surfaces 330 and lift the deformable object 350 off of the surface 352. In some embodiments, the inclined surfaces 330 can be formed from a material that has relatively low friction, such as polyoxymethylene, polytetrafluoroethylene, or any other material. In some embodiments, the entirety of the fingers 332 are made from a relatively low friction material. In other embodiments, the inclined surfaces 330 are coated with a relatively low friction material and the other portions of the fingers 332 are made from another material.

As can be seen in FIG. 11C, the fingers 332 are capable of lifting the deformable object 350 from the surface 352 even though the fingers 332 are statically coupled to the arms 320. The use of static fingers can reduce the complexity of the arms 320 and the fingers 332 such that the system 300 is easier to clean than other systems that have movable fingers (e.g., the system 200 with rotatable fingers 232). In some embodiments, the predetermined pressure within the fluid power system is selected such that the deformable object 350 is lifted from the surface 352, as shown in FIG. 11C, but the deformable object 350 does not contact any portion of the arms 320 other than the fingers 332. In some embodiments, the fingers 332 are coupled to the arms using fasteners (e.g., bolts, screws), quick release fasteners (e.g., pins), or any other coupling mechanism capable of holding the fingers 332 to the arms 320 while permitting the fingers 332 to be removed from the arms 320 (e.g., for cleaning).

Figure 12A:
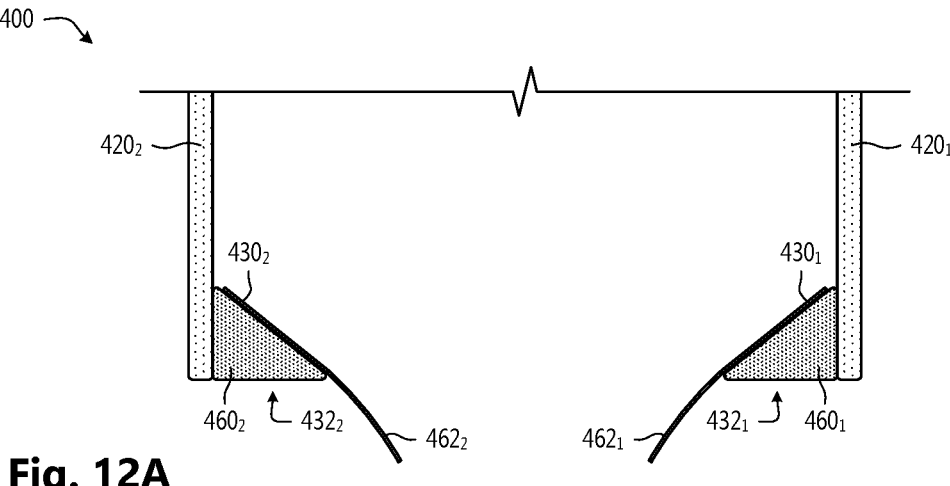
FIGS. 12A and 12B depict partial front and partial perspective views, respectively, of a system that includes static fingers with a flexible sheet material, in accordance with the embodiments described herein.
Figure 12B:
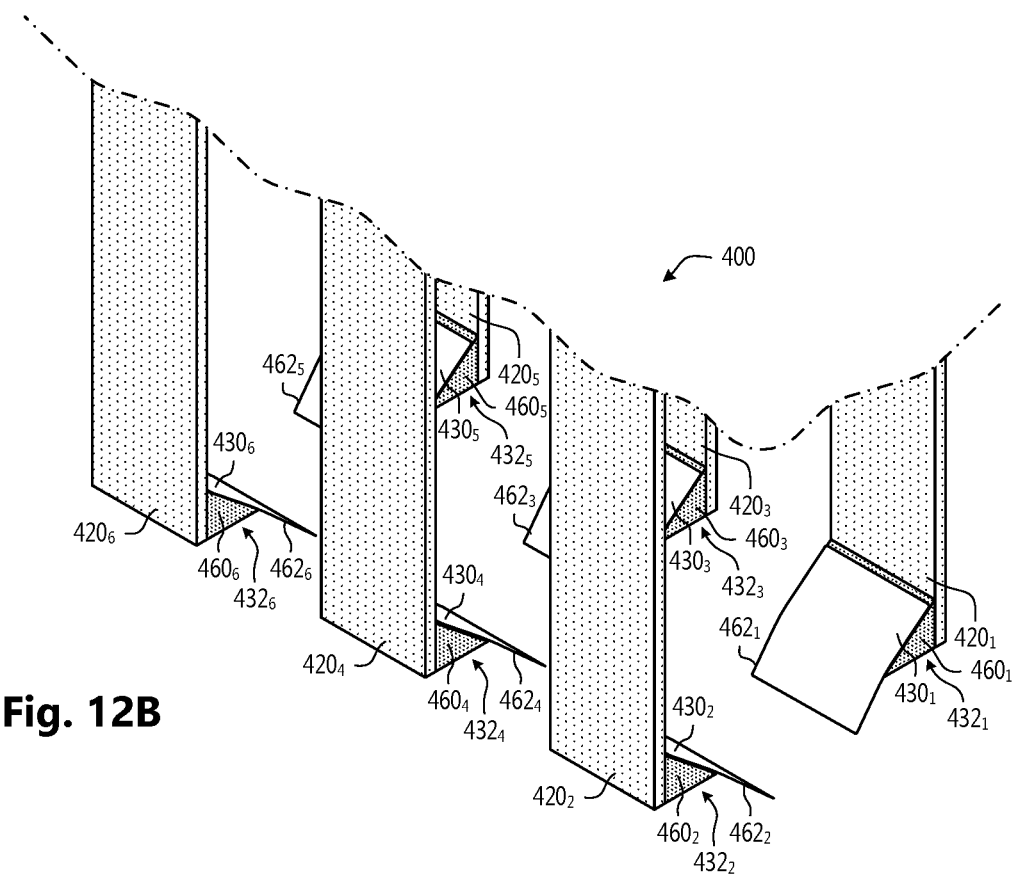

FIGS. 12A and 12B depict partial front and partial perspective views, respectively, of a system 400 that includes static fingers with a flexible sheet material. The system 400 includes arms $420_1$, $420_2$, $420_3$, $420_4$, $420_5$, $420_6$ (collectively, arms 420) that form three pairs of opposing arms. In some embodiments, the system 400 further includes a support structure (not visible in FIGS. 12A to 12B) coupled to each of the pairs of opposing arms 420 in the system 400. The system 400 further includes inclined surfaces $430_1$, $430_2$, $430_3$, $430_4$, $430_5$, $430_6$ (collectively, inclined surfaces 430). The inclined surfaces 430 are configured to contact sides of a deformable object as the system 400 lifts the deformable object from a surface. The inclined surfaces $430_1$, $430_2$, $430_3$, $430_4$, $430_5$, $430_6$ are located on the arms $420_1$, $420_2$, $420_3$, $420_4$, $420_5$, $420_6$, respectively.

The system 400 further includes fingers $432_1$, $432_2$, $432_3$, $432_4$, $432_5$, $432_6$ (collectively, fingers 432). The fingers $432_1$, $432_2$, $432_3$, $432_4$, $432_5$, $432_6$ include the inclined surfaces $430_1$, $430_2$, $430_3$, $430_4$, $430_5$, $430_6$, respectively. In some embodiments, the fingers $432_1$, $432_2$, $432_3$, $432_4$, $432_5$, $432_6$ include rigid supports fingers $460_1$, $460_2$, $460_3$, $460_4$, $460_5$, $460_6$ (collectively rigid supports 460), respectively, and flexible sheet materials $462_1$, $462_2$, $462_3$, $462_4$, $462_5$, $462_6$ (collectively flexible sheet materials 462), respectively. In the depicted embodiments, the rigid supports 460 are statically coupled to distal ends of the arms 420 and the flexible sheet materials 462 are coupled to rigid inclined surfaces of the rigid supports 460. In the depicted embodiment, the flexible sheet materials 462 are arranged with respect to the rigid supports 460 such that a portion of each of the flexible sheet materials 462 extends below the lower end of the rigid supports 460. In the depicted embodiment, one surface of each of the flexible sheet materials 462 abuts one of the rigid supports 460 and the inclined surfaces 430 are the surfaces of the flexible sheet materials 462 opposite those that abut the rigid supports 460.

Figure 13A:
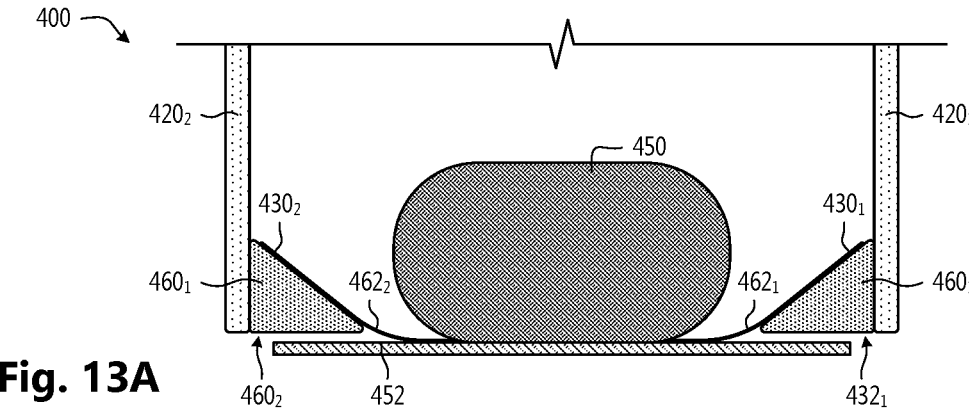
FIGS. 13A to 13C depict instances of an embodiment of a method of using the system shown in FIGS. 12A and 12B to lift a deformable object from a surface, in accordance with the embodiments described herein.
Figure 13B:
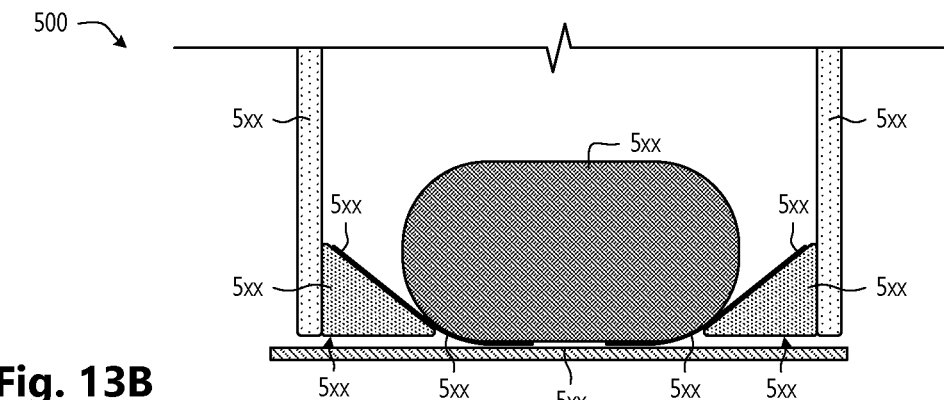
Figure 13C:
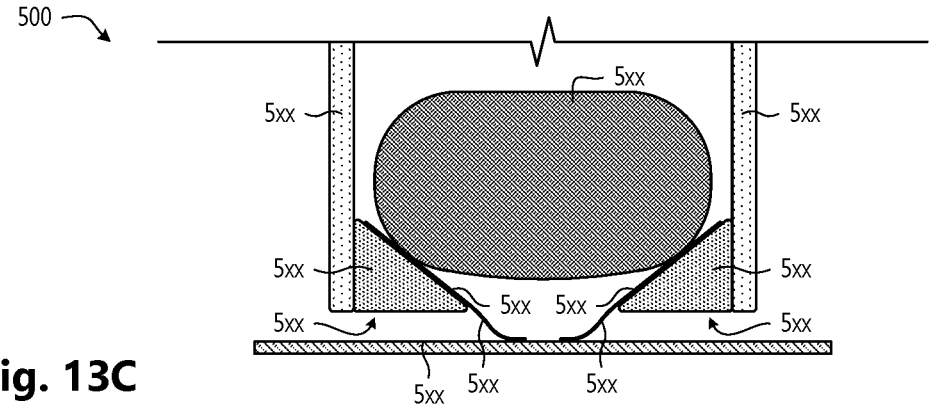

FIGS. 13A to 13C depict instances of an embodiment of a method of the system 400 being used to lift a deformable object 450 from a surface 452. In FIG. 13A, the arms 420 are withdrawn from the sides of the deformable object 450. The fingers 432 are positioned with the rigid supports 460 slightly above the surface 452 and portions of the flexible sheet materials 462 that extend beyond the rigid supports 460 are in contact with the surface 452. In FIG. 13B, the arms 420 have been closed until the inclined surfaces 430 have come into contact with the right and left sides of the deformable object 450. In some embodiments, the system 400 includes a fluid power driver operatively coupled in parallel to each of the pairs of opposing arms via a fluid power system, and the arms 420 are closed by the fluid power driver increasing the pressure in the fluid power system. Although not shown in FIGS. 13A to 13C, each of the pairs of opposing arms in the system 400 is coupled in parallel to the fluid power driver so that each of the pairs of arms is capable of closing a different distance until the inclined surfaces 430 are all in contact with the sides of the deformable object 450.

From the instance shown in FIG. 13B to the instance shown in FIG. 13C, the fluid power driver has increased the pressure in the fluid power system (e.g., to a predetermined pressure). Because all of the inclined surfaces 430 were in contact with the deformable object 450 at the instance shown in FIG. 13B, the increase in pressure in the fluid power system to the instance shown in FIG. 13C caused the arms 420 to exert a compressive force on the deformable object 450. The compressive force exerted by the arms 420 on the deformable object 450 causes the deformable object 450 to slide up the inclined surfaces 430 and lift the deformable object 450 off of the surface 452. In some embodiments, the flexible sheet materials can be formed from a material that has relatively low friction, such as polyoxymethylene, polytetrafluoroethylene, or any other low-friction material.

As can be seen in FIG. 13C, the fingers 432 are capable of lifting the deformable object 450 from the surface 452 even though the fingers 432 are statically coupled to the arms 420. The use of static fingers can reduce the complexity of the arms 320 and the fingers 432 such that the system 400 is easier to clean than other systems that have movable fingers (e.g., the system 200 with rotatable fingers 232). In some embodiments, the predetermined pressure within the fluid power system is selected such that the deformable object 450 is lifted from the surface 452, as shown in FIG. 13C, but the deformable object 450 does not contact any portion of the arms 420 other than the fingers 432. In some embodiments, the fingers 432 are coupled to the arms 420 using fasteners (e.g., bolts, screws), quick release fasteners (e.g., pins), or any other coupling mechanism capable of holding the fingers 432 to the arms 420 while permitting the fingers 432 to be removed from the arms 420 (e.g., for cleaning). In some embodiments, the flexible sheet materials 462 are coupled to the rigid supports 460 using fasteners (e.g., bolts, screws), quick release fasteners (e.g., pins), or any other coupling mechanism capable of holding the flexible sheet materials 462 to the rigid supports 460 while permitting the flexible sheet materials 462 to be removed from the rigid supports 460 (e.g., for cleaning).

FIGS. 14A to 14E depict an embodiment of a method of using the system 100 to lift and move deformable objects. More specifically, each of FIGS. 14A to 14E depicts a top view of an environment 500 showing one instance of the method. The environment 500 includes two surfaces $552_1$ and $552_2$. In the depicted embodiment, the surface $552_1$ is the surface of a conveyor belt configured to convey deformable objects in a downstream direction $554_1$ and the surface $552_2$ is the surface of a conveyor belt configured to convey deformable objects in a downstream direction 5542. The environment 500 also includes a robotic arm 570. The system 100 is coupled to a distal end of the robotic arm 570. The robotic arm 570 is configured to move the system 100 to any location within a three-dimensional range and to orient the system 100. In the depicted embodiment, the base of the robotic arm 570 is located between the surfaces $552_1$ and $552_2$ such that the robotic arm 570 is capable of locating the system 100 over locations of both of the surfaces $552_1$ and $552_2$.

Figure 14A:
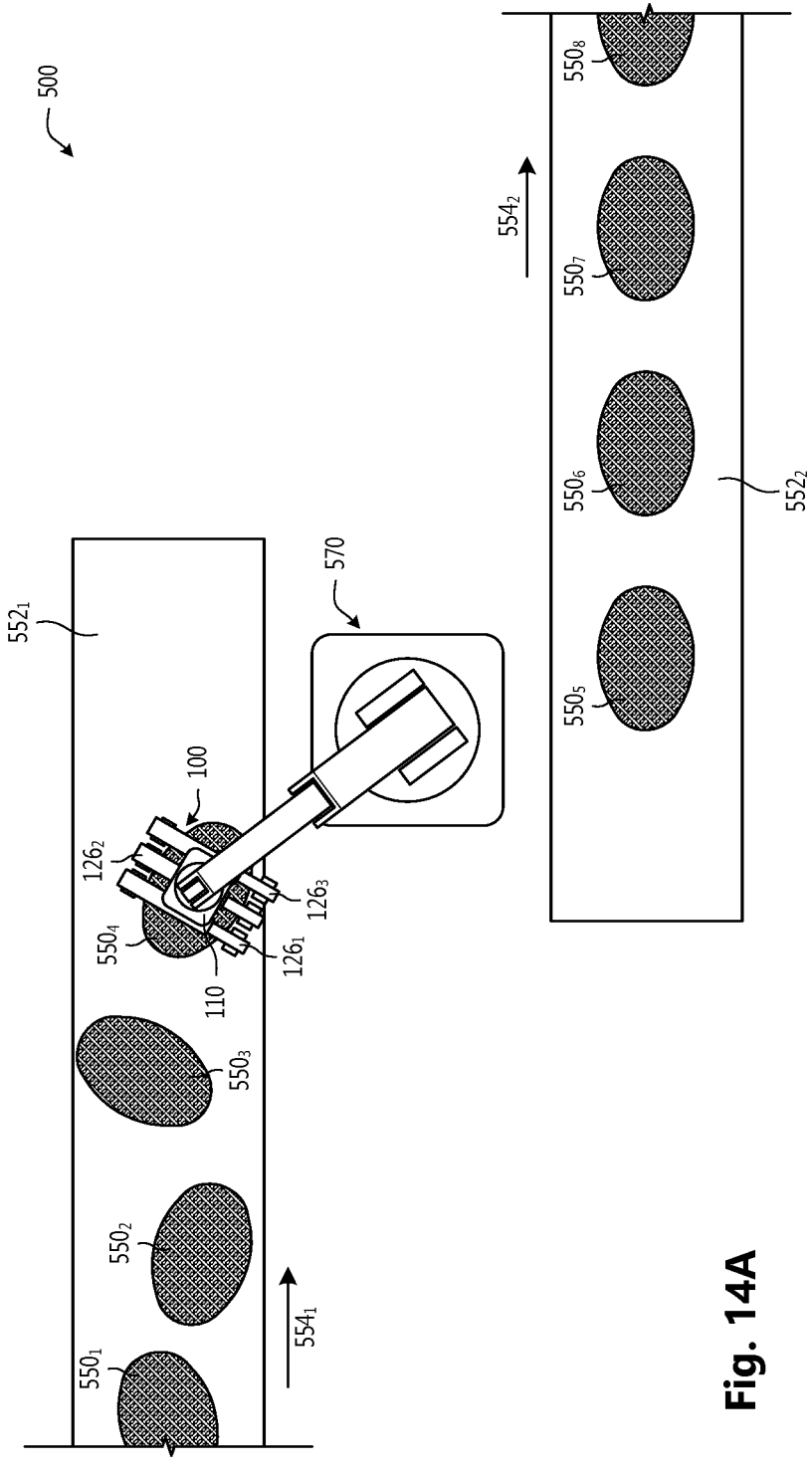
FIGS. 14A to 14E depict an embodiment of a method of using the system shown in FIGS. 1 and 2 to lift and move deformable objects within an environment, in accordance with the embodiments described herein.
Figure 14B:
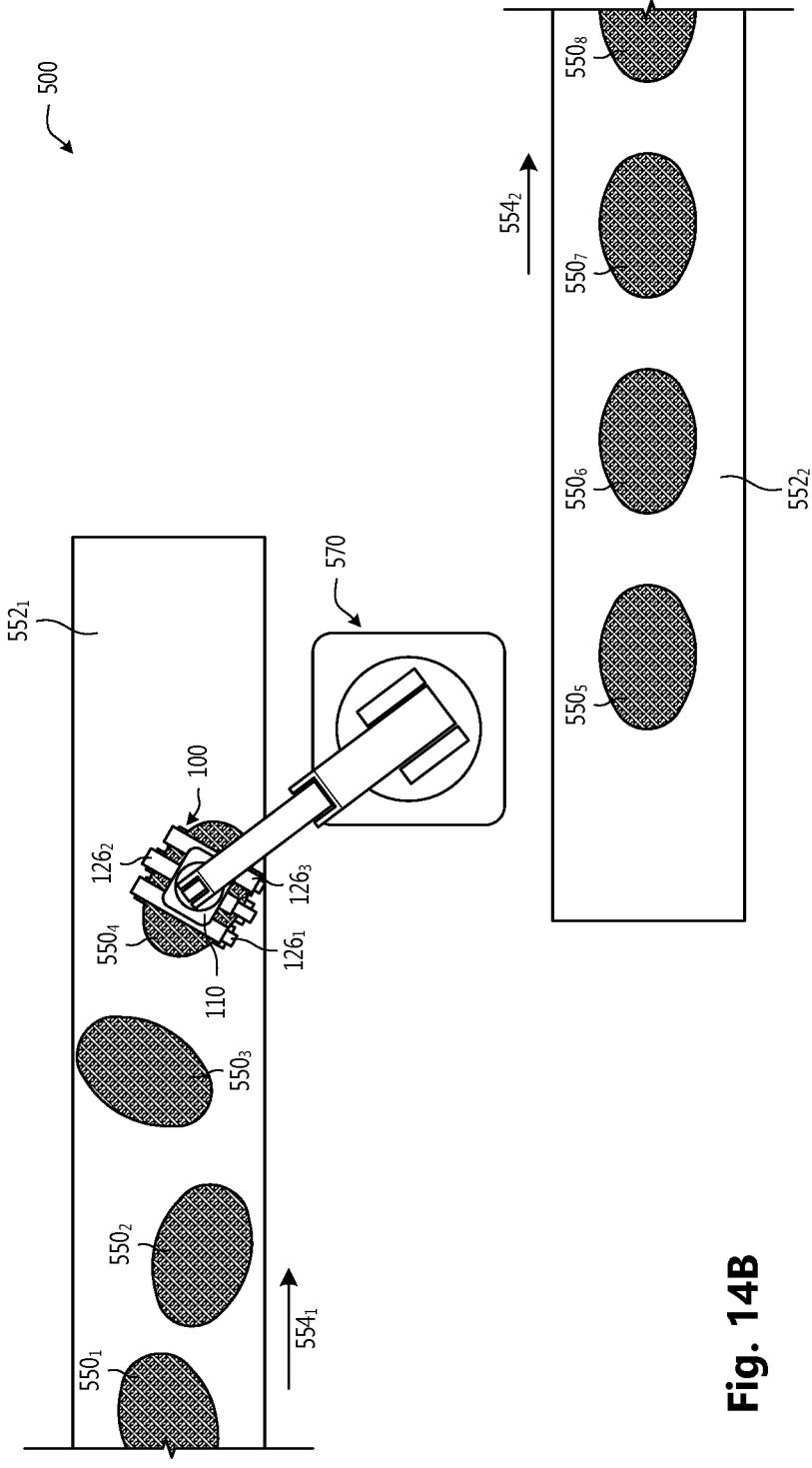
Figure 14C:
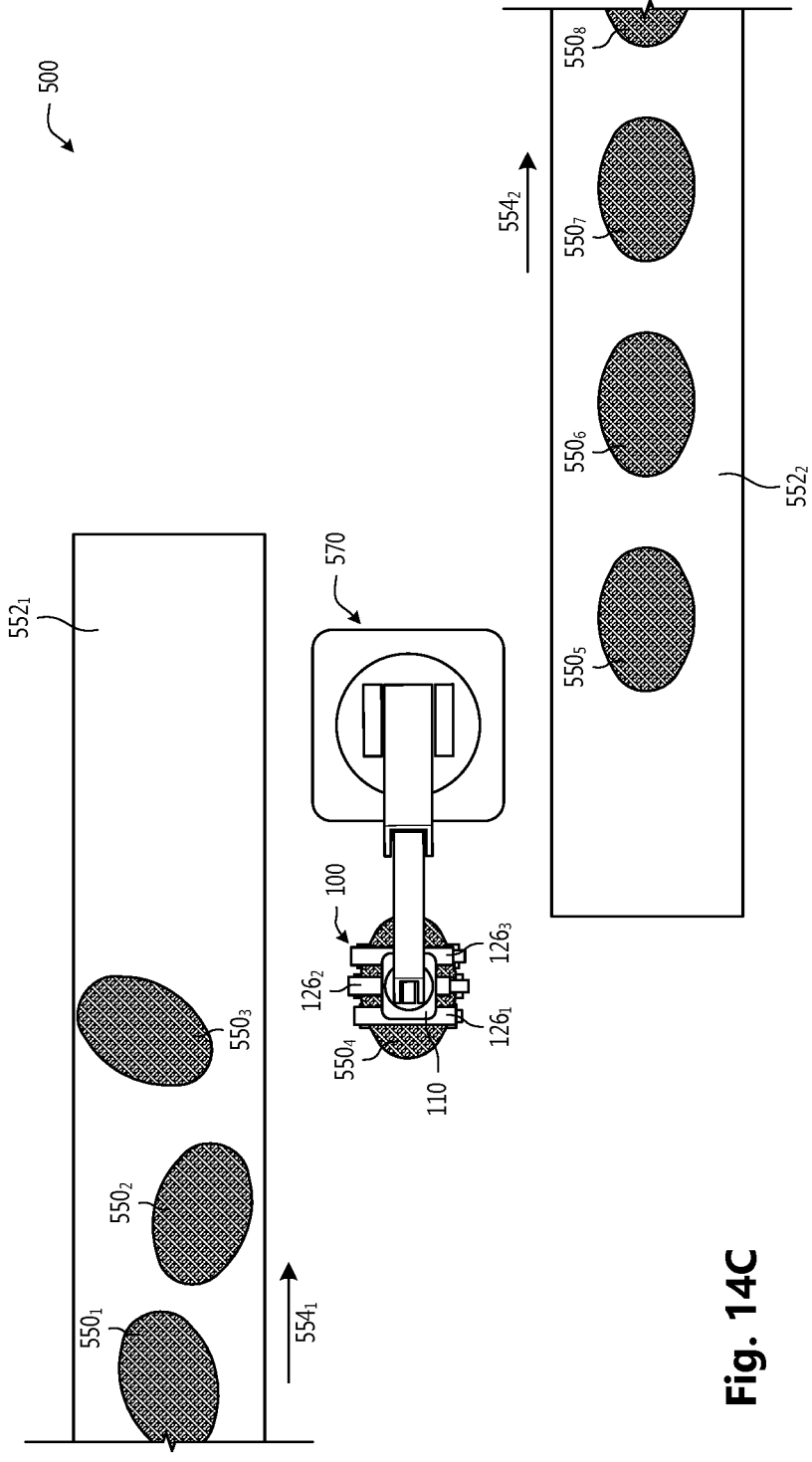
Figure 14D:
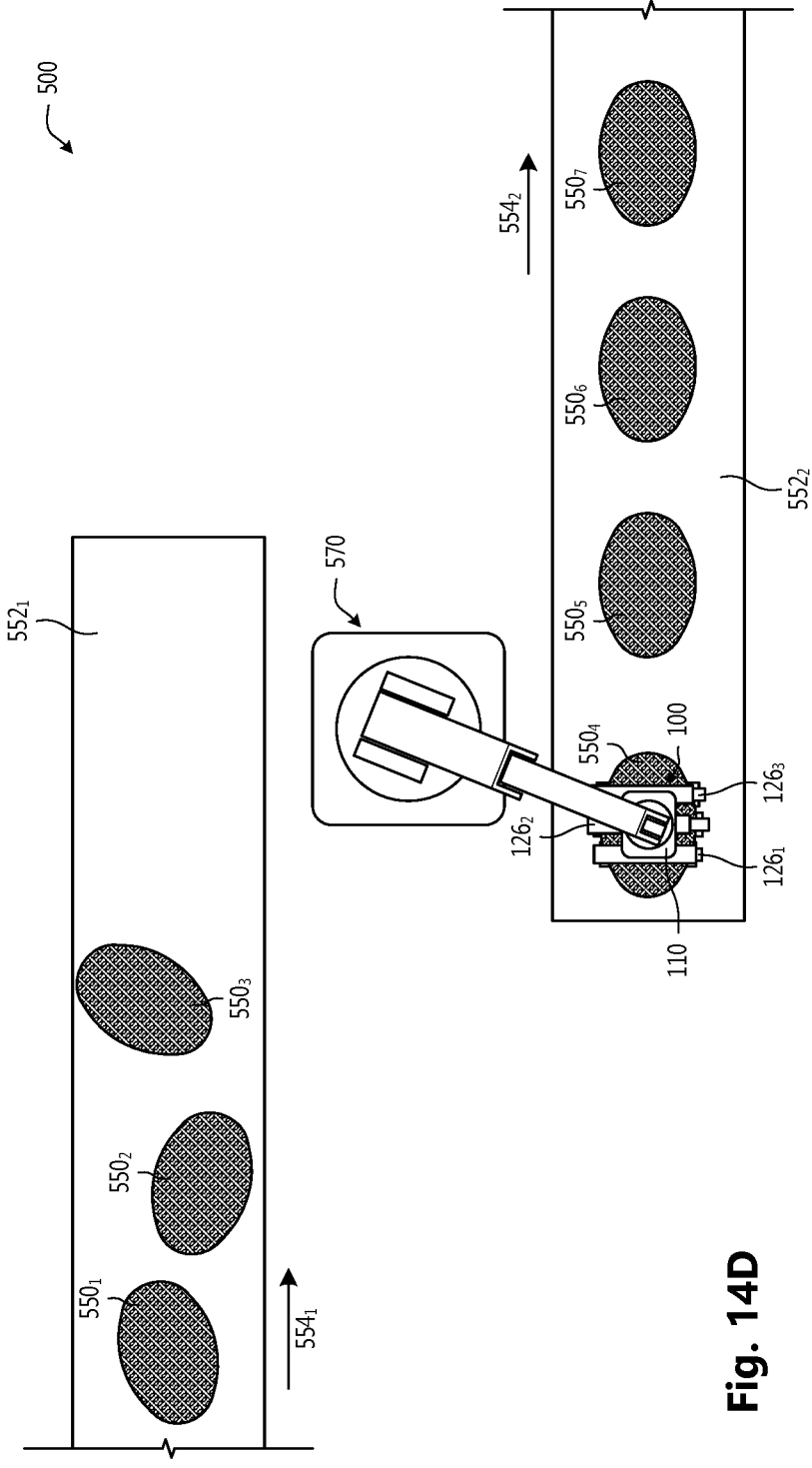
Figure 14E:
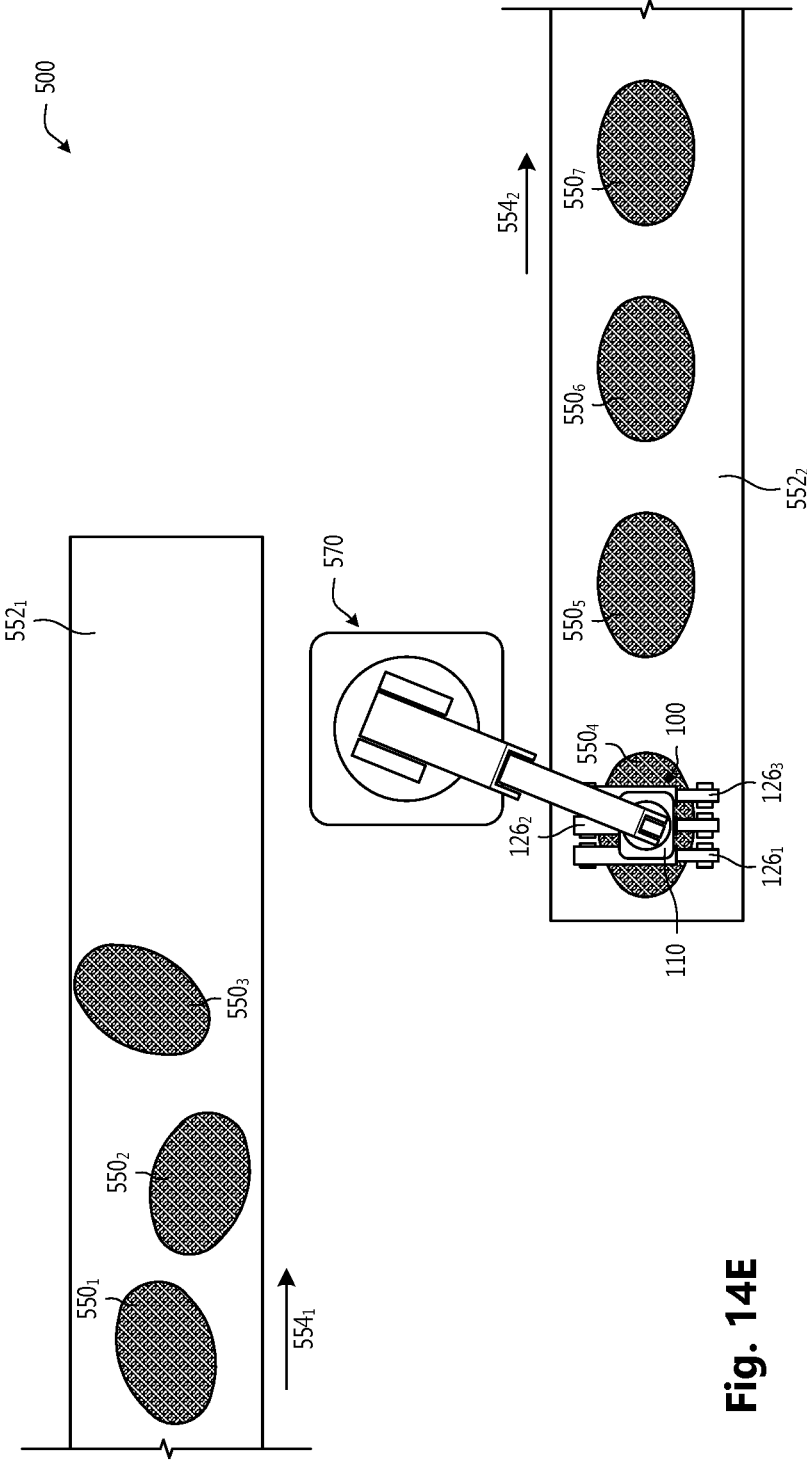

In FIGS. 14A to 14C, the system 100 has been depicted with pairs of opposing arms $126_1$, $126_2$, $126_3$ (collectively, pairs of opposing arms 126). Each of the pairs of opposing arms 126 is intended to represent two of the arms 120 and components associated with two of the arms. For example, the pair of opposing arms $126_1$ could represent the bracket $114_1$, the port $116_1$, the arms $120_1$ and $120_2$, the biasing mechanism $122_1$, the driving mechanism $124_1$, the inclined surfaces $130_1$ and $130_2$, and the fingers $132_1$ and $132_2$; the pair of opposing arms $126_2$ could represent the bracket $114_2$, the port $116_2$, the arms $120_3$ and $120_4$, the biasing mechanism $122_2$, the driving mechanism $124_2$, the inclined surfaces $130_3$ and $130_4$, and the fingers $132_3$ and $132_4$; and the pair of opposing arms $126_3$ could represent the bracket $114_3$, the port $116_3$, the arms $120_5$ and $120_6$, the biasing mechanism $122_3$, the driving mechanism $124_3$, the inclined surfaces $130_5$ and $130_6$, and the fingers $132_5$ and $132_6$. Moreover, it will be understood that the system $100$ in the environment $500$ could be replaced by any other embodiment of systems suitable for lifting deformable objects from surfaces, such as the system $200$, the system $300$, and the system $400$.

At the instance shown in FIG. $14A$, deformable objects $550_1$, $550_2$, $550_3$, $550_4$ are located on the surface $552_1$ and deformable objects $550_5$, $550_6$, $550_7$, $550_8$ are located on the surface $552_2$. The conveyor that includes the surface $552_1$ is moving the deformable objects $550_1$, $550_2$, $550_3$, $550_4$ in the downstream direction $554_1$ and the conveyor that includes the surface $552_2$ is moving the deformable objects $550_5$, $550_6$, $550_7$, $550_8$ in the downstream direction $554_2$. In the depicted embodiment, the deformable objects $550_1$, $550_2$, $550_3$, $550_4$ are located on the surface $552_1$ in a somewhat random or haphazard arrangement. This may be the case where the deformable objects are cuts of raw meat that have been placed on the conveyor that includes the surface $552_1$ as they are being cut without concern for how the orientation and/or spacing between the deformable objects $550_1$, $550_2$, $550_3$, $550_4$. In contrast, the deformable objects $550_5$, $550_6$, $550_7$, $550_8$ are located on the surface $552_2$ such that the deformable objects $550_5$, $550_6$, $550_7$, $550_8$ are substantially aligned with each other and have at least a minimum spacing between each other. In some embodiments, the robotic arm $570$ may be configured (e.g., programmed, instructed, etc.) to move the deformable objects from the surface $552_1$ to the surface $552_2$ so as to convert the deformable objects from a random or haphazard arrangement to an aligned and/or signulated arrangement.

At the instance shown in FIG. $14A$, the robotic arm $570$ has positioned the support structure $110$ of the system $100$ over the deformable object $550_4$. The robotic arm $570$ has also aligned the system $100$ so that the inclined surfaces $130$ of the pairs of opposing arms $126$ are substantially parallel to a longitudinal direction (e.g., the direction of the longest dimension) of the deformable object $550_4$. In some embodiments, the robotic arm $570$ can position and orient the system $100$ based on feedback from one or more sensors, such as a camera (visible light, infrared, ultraviolet, etc.), a proximity detector, a lidar array, any other type of sensor, or any combination thereof. In some embodiments, one or more sensors can be positioned on the robotic arm $570$ and/or the system $100$. For example, a camera can be located on the support structure $110$ and oriented downward from an intended location of the center of a deformable object. In some embodiments, one or more sensors can be positioned elsewhere within the environment $500$, such as on the conveyor that includes the surface $552_1$ upstream of the robotic arm, on a structure of the environment (e.g., on walls or a ceiling), or anywhere else within the environment.

At the instance shown in FIG. $14A$, the arms $120$ of the pairs of opposing arms $126$ are withdrawn from the sides of the deformable object $550_4$, similar to the positioning of the arms $120$ in the depicted shown in FIGS. $3A$ and $3B$. From there, the fluid power driver $140$ increases the pressure in the fluid power system $142$ until, at the instance shown in FIG. $14B$, the pressure reaches a predetermined pressure. Between the instance shown in FIG. $14A$ and the instance shown in FIG. $14B$, each of the pairs of opposing arms $126$ closed an independent distance until all of the inclined surfaces $130$ were in contact with the deformable object $550_4$ and then the arms $120$ exerted a compressive force on the deformable object $550_4$ to cause the deformable object $550_4$ to slide up the inclined surfaces $130$. In this way, the system $100$ has lifted the deformable object $550_4$ from the surface $552_1$ before the instance shown in FIG. $14B$ and the system $100$ is securely holding the deformable object $550_4$.

From the instance shown in FIG. $14B$, the robotic arm $570$ can move the deformable object $550_4$ by moving the system $100$ with the deformable object $550_4$ held securely therein. In FIG. $14C$, the robotic arm $570$ is moving the system $100$ counterclockwise toward the surface $552_2$. The fluid power driver $140$ maintains pressure in the fluid power system $142$ at the predetermined pressure so that the arms $120$ of the pairs of opposing arms $126$ continue to securely hold the deformable object $550_4$ as the deformable object $550_4$ is moved. The robotic arm $570$ continue moving the system with the deformable object $550_4$ held securely therein until it reaches the position shown in FIG. $14D$. The position of the system $100$ by the robotic arm $570$ in FIG. $14D$ may be determined based on a desired spacing (e.g., a minimum spacing) between the deformable object $550_4$ and the deformable object $550_5$ on the surface $552_2$. The orientation of the system $100$ by the robotic arm $570$ in FIG. $14D$ may be determined based on a desired alignment and/or orientation of the deformable objects on the surface $552_2$.

In the instance shown in FIG. $14D$, the fluid power driver $140$ continues to maintain the pressure in the fluid power system $142$ so that the system $100$ holds the deformable object $550_4$ above the surface $552_2$. From that instance, the fluid power driver $140$ may reduce the pressure to the fluid power system $142$. The reduced pressure in the fluid power system $142$ can allow the biasing mechanisms $122$ to cause the arms $120$ in the pairs of opposing arms $126$ to withdraw from each other to the instance shown in FIG. $14E$. As the pairs of opposing arms $126$ withdraw from each other, the deformable object $550_4$ will be lowered down the inclined surfaces $130$ and then dropped from the inclined surfaces $130$ onto the surface $552_2$. In some embodiments, the robotic arm $570$ is configured to position the system $100$ with respect to the surface $552_2$ such that the fall of the deformable object $550_4$ from the inclined surfaces $130$ onto the surface $552_2$ does not significantly damage the deformable object $550_4$.

It will be noted that many variations of the environment $500$ are possible. In some embodiments, the environment $500$ could have any number of conveyor surfaces. In one example, the environment could have a single conveyor where the robotic arm $570$ uses the system $100$ to reposition haphazardly-placed deformable objects from an input end of the conveyor to a singulated and aligned orientation of the deformable objects on an output end of the conveyor. In another example, the environment $500$ could have a single input conveyor that has haphazardly-placed deformable objects and a plurality of output conveyors where the robotic arm $570$ uses the system $100$ to reposition haphazardly-placed deformable objects from the input conveyor onto one of the plurality of output conveyors.

FIG. $15$ depicts an example embodiment of a system $610$ that may be used to implement some or all of the embodiments described herein. In the depicted embodiment, the system 610 includes computing devices 620₁, 620₂, 620₃, and 620₄ (collectively computing devices 620). In the depicted embodiment, the computing device 620₁ is a tablet, the computing device 620₂ is a mobile phone, the computing device 620₃ is a desktop computer, and the computing device 620₄ is a laptop computer. In other embodiments, the computing devices 620 include one or more of a desktop computer, a mobile phone, a tablet, a phablet, a notebook computer, a laptop computer, a distributed system, a gaming console (e.g., Xbox, Play Station, Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

Figure 15:
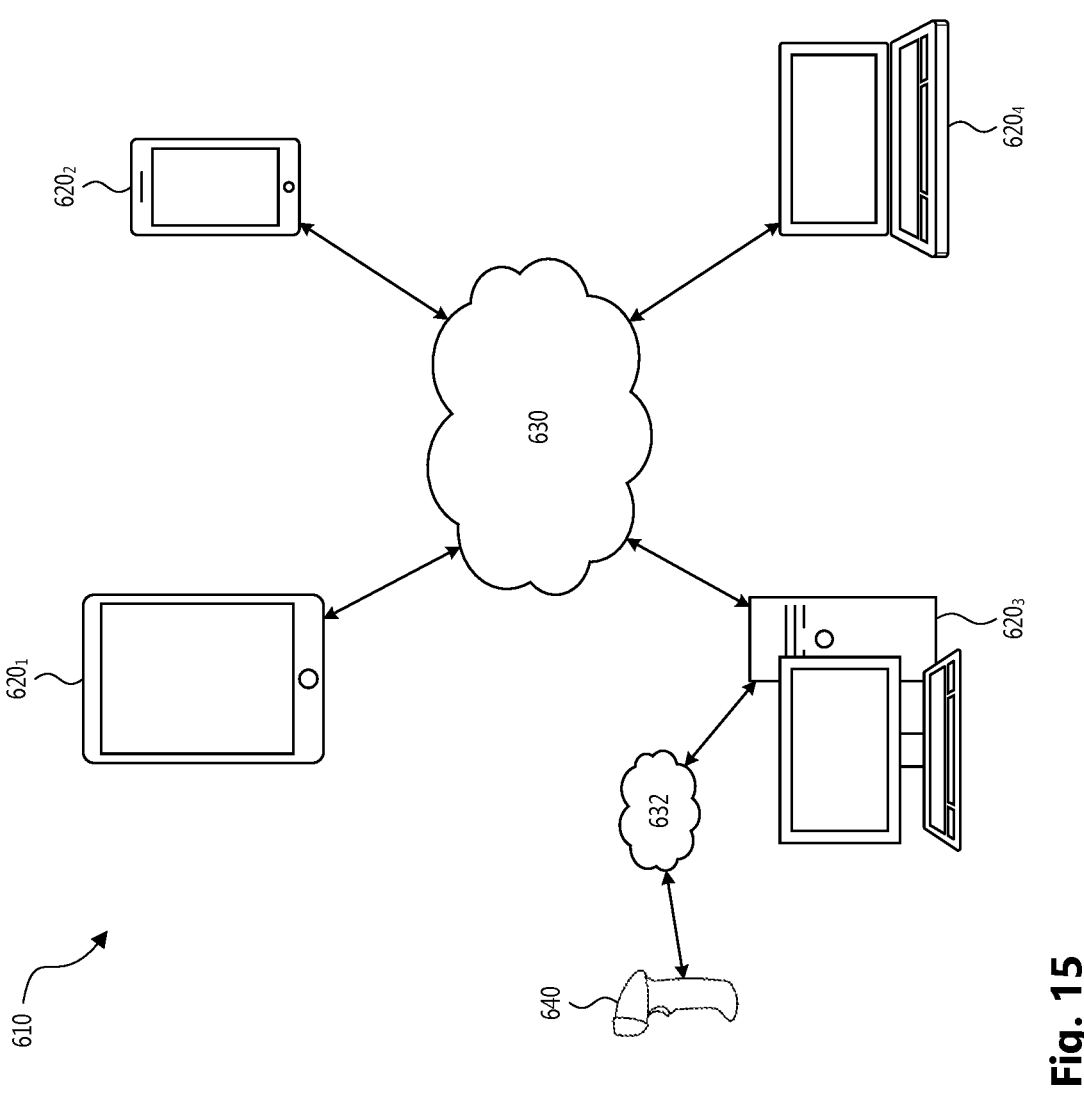
FIG. 15 depicts an example embodiment of a system that may be used to implement some or all of the embodiments described herein.

The computing devices 620 are communicatively coupled to each other via one or more networks 630 and 632. Each of the networks 630 and 632 may include one or more wired or wireless networks (e.g., a 3G network, the Internet, an internal network, a proprietary network, a secured network). The computing devices 620 are capable of communicating with each other and/or any other computing devices via one or more wired or wireless networks. While the particular system 610 in FIG. 15 depicts that the computing devices 620 communicatively coupled via the network 630 include four computing devices, any number of computing devices may be communicatively coupled via the network 630.

In the depicted embodiment, the computing device 620₃ is communicatively coupled with a peripheral device 640 via the network 632. In the depicted embodiment, the peripheral device 640 is a scanner, such as a barcode scanner, an optical scanner, a computer vision device, and the like. In some embodiments, the network 632 is a wired network (e.g., a direct wired connection between the peripheral device 640 and the computing device 620₃), a wireless network (e.g., a Bluetooth connection or a WiFi connection), or a combination of wired and wireless networks (e.g., a Bluetooth connection between the peripheral device 640 and a cradle of the peripheral device 640 and a wired connection between the peripheral device 640 and the computing device 620₃). In some embodiments, the peripheral device 640 is itself a computing device (sometimes called a "smart" device). In other embodiments, the peripheral device 640 is not a computing device (sometimes called a "dumb" device).

Figure 16:
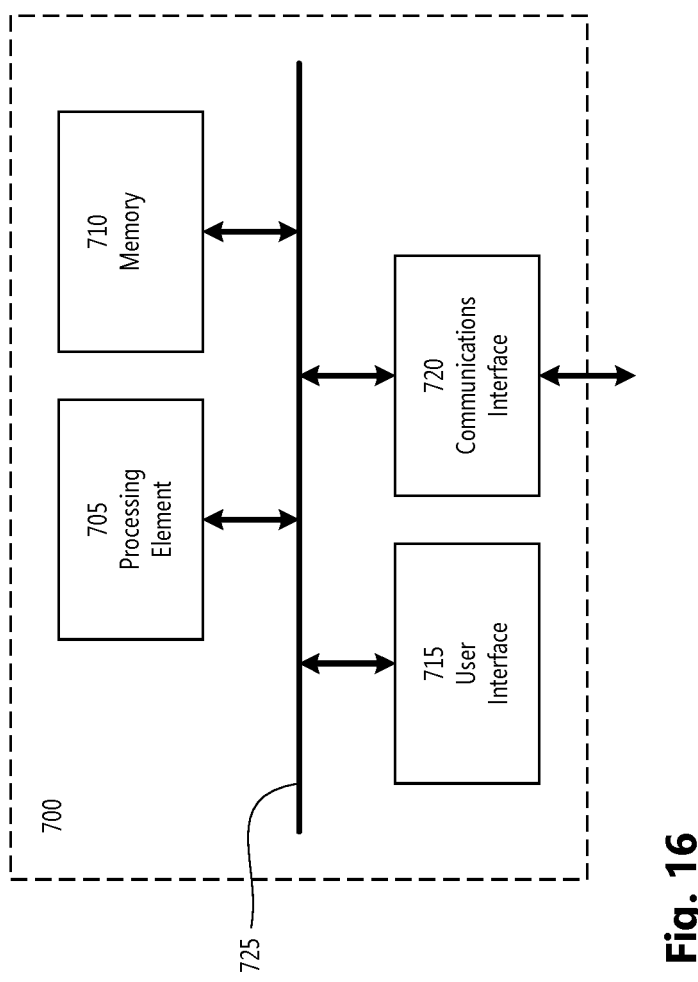
FIG. 16 depicts a block diagram of an embodiment of a computing device, in accordance with the embodiments described herein.

Depicted in FIG. 16 is a block diagram of an embodiment of a computing device 700. Any of the computing devices 620 and/or any other computing device described herein may include some or all of the components and features of the computing device 700. In some embodiments, the computing device 700 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 700 includes a processing element 705, memory 710, a user interface 715, and a communications interface 720. The processing element 705, memory 710, a user interface 715, and a communications interface 720 are capable of communicating via a communication bus 725 by reading data from and/or writing data to the communication bus 725. The computing device 700 may include other components that are capable of communicating via the communication bus 725. In other embodiments, the computing device does not include the communication bus 725 and the components of the computing device 700 are capable of communicating with each other in some other way.

The processing element 705 (also referred to as one or more processors, processing circuitry, and/or similar terms used herein) is capable of performing operations on some external data source. For example, the processing element may perform operations on data in the memory 710, data receives via the user interface 715, and/or data received via the communications interface 720. As will be understood, the processing element 705 may be embodied in a number of different ways. In some embodiments, the processing element 705 includes one or more complex programmable logic devices (CPLDs), microprocessors, multi-core processors, co processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 705 is configured for a particular use or configured to execute instructions stored in volatile or nonvolatile media or otherwise accessible to the processing element 705. As such, whether configured by hardware or computer program products, or by a combination thereof, the processing element 705 may be capable of performing steps or operations when configured accordingly.

The memory 710 in the computing device 700 is configured to store data, computer-executable instructions, and/or any other information. In some embodiments, the memory 710 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random access memory (NVRAM), magneto-resistive random access memory (MRAM), resistive random-access memory (RRAM), Silicon Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 710 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity relationship model, object model, document model, semantic model, graph model, or any other model.

The user interface 715 of the computing device 700 is in communication with one or more input or output devices that are capable of receiving inputs into and/or outputting any outputs from the computing device 700. Embodiments of input devices include a keyboard, a mouse, a touchscreen display, a touch sensitive pad, a motion input device, movement input device, an audio input, a pointing device input, a joystick input, a keypad input, peripheral device 640, foot switch, and the like. Embodiments of output devices include an audio output device, a video output, a display device, a motion output device, a movement output device, a printing device, and the like. In some embodiments, the user interface 715 includes hardware that is configured to communicate with one or more input devices and/or output devices via wired and/or wireless connections.

The communications interface 720 is capable of communicating with various computing devices and/or networks. In some embodiments, the communications interface 720 is capable of communicating data, content, and/or any other information, that can be transmitted, received, operated on, processed, displayed, stored, and the like. Communication via the communications interface 720 may be executed using a wired data transmission protocol, such as fiber distributed data interface (FDDI), digital subscriber line (DSL), Ethernet, asynchronous transfer mode (ATM), frame relay, data over cable service interface specification (DOC-SIS), or any other wired transmission protocol. Similarly, communication via the communications interface 720 may be executed using a wireless data transmission protocol, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the computing device 700 may be located remotely from other components of the computing device 700 components, such as in a distributed system. Furthermore, one or more of the components may be combined and additional components performing functions described herein may be included in the computing device 700. Thus, the computing device 700 can be adapted to accommodate a variety of needs and circumstances. The depicted and described architectures and descriptions are provided for exemplary purposes only and are not limiting to the various embodiments described herein.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure.

Accordingly, it is expressly intended that all such variations, changes, and equivalents fall within the spirit and scope of the present disclosure, as claimed.

What is claimed is:

1. A system for lifting a deformable object from a surface, the system comprising:

a support structure;

first, second, third, and fourth arms coupled to the support structure, wherein the first and second arms define a first pair of opposing arms and the third and fourth arms define a second pair of opposing arms;

first, second, third, and fourth inclined surfaces located, respectively, on the first, second, third, and fourth arms, wherein each of the first, second, third, and fourth inclined surfaces is configured to contact the deformable object; and a fluid power driver operatively coupled in parallel to the first and second pairs of opposing arms via a fluid power system;

wherein, when the support structure is positioned above the deformable object on the surface, the fluid power driver is configured to increase pressure in the fluid power system until the pressure in the fluid power system reaches a predetermined level such that:

each of the first and second pairs of opposing arms independently closes a distance until the first and third inclined surfaces are in contact with a first side of the deformable object and the second and fourth inclined surfaces are in contact with a second side of the deformable object, and the first and second pairs of opposing arms exert a compressive force on the deformable object that causes the deformable object to slide up one or more of the first, second, third, and fourth inclined surfaces to lift the deformable object off of the surface.

2. The system of claim 1, wherein the first and second pairs of opposing arms is center-justified such that movement of the first arm toward or away from the second arm causes a corresponding movement of the second arm toward or away from the first arm and the third arm toward or away from the fourth arm causes a corresponding movement of the fourth arm toward or away from the third arm.

3. The system of claim 2, further comprising:

a first belt coupled between the first and second arms; and a second belt coupled between the third and fourth arms;

wherein the first and second belts are coupled to the fluid power system to cause corresponding movements of the first and second pairs of opposing arms.

4. The system of claim 1, wherein each of the first, second, third, and fourth inclined surfaces includes a flexible sheet material.

5. The system of claim 4, wherein the flexible sheet material of each of the first, second, third, and fourth inclined surfaces is fixedly coupled to a rigid inclined surface on a distal end of each of the first, second, third, and fourth arms.

6. The system of claim 1, wherein each of the first, second, third, and fourth inclined surfaces is a rigid surface.

7. The system of claim 1, wherein:

the first, second, third, and fourth arms comprise first, second, third, and fourth fingers, the first, second, third, and fourth fingers rotatably coupled, respectively, to distal ends of the first, second, third, and fourth arms; and the first, second, third, and fourth fingers comprise, respectively, the first, second, third, and fourth inclined surfaces.

8. The system of claim 7, wherein:

the first, second, third, and fourth fingers include, respectively, first, second, third, and fourth lateral contact surfaces;

the first and third lateral contact surfaces are arranged to contact the first side of the deformable object; and the second and fourth lateral contact surfaces are arranged to contact the second side of the deformable object.

9. The system of claim 8, wherein:

the first, second, third, and fourth lateral contact surfaces are at a fixed angle with respect to the first, second, third, and fourth inclined surfaces, respectively;

the first, second, third, and fourth fingers are biased toward a lower rotational position; and when the first and second pairs of opposing arms exert a compressive force on the deformable object, contact between the first and third contact surfaces and the first side of the deformable object and contact between the second and fourth contact surfaces and the second side of the deformable object cause the first, second, third, and fourth fingers to be rotated toward a higher rotational position.

10. The system of claim 9, wherein rotation of the first, second, third, and fourth fingers from the lower rotational position toward the higher rotational position causes the first, second, third, and fourth fingers to exert a lifting force on the deformable object.

11. The system of claim 9, wherein each of the first, second, third, and fourth arms comprises a biasing mechanism configured to bias the first, second, third, and fourth fingers to the lower rotational position.

12. The system of claim 9, wherein each of the first, second, third, and fourth fingers is removably coupled, respectively, to the distal ends of the first, second, third, and fourth arms via a pin, and wherein the each of the first, second, third, and fourth fingers is configured to rotate about the pin in order to rotate about a respective one of the first, second, third, and fourth arms.

13. The system of claim 1, further comprising:

fifth and sixth arms coupled to the support structure, wherein the fifth and sixth arms define a third pair of opposing arms; and fifth and sixth inclined surfaces located, respectively, on the fifth and sixth arms, wherein each of the fifth and sixth inclined surfaces is configured to contact the deformable object;

wherein the fluid power driver is operatively coupled in parallel to the first, second, and third pairs of opposing arms via the fluid power system;

wherein, when the fluid power driver increases the pressure in the fluid power system until the pressure in the fluid power system reaches the predetermined level:

the third pair of opposing arms independently closes a distance until the fifth inclined surface is in contact with the first side of the deformable object and the sixth inclined surfaces is in contact with the second side of the deformable object, and the third pair of opposing arms exerts a compressive force on the deformable object that causes the deformable object to slide up one or more of the fifth and sixth inclined surfaces to lift the deformable object off of the surface.

14. The system of claim 13, wherein:

the fifth and sixth arms comprise fifth and sixth fingers, the fifth and sixth fingers rotatably coupled, respectively, to distal ends of the fifth and sixth arms; and the fifth and sixth fingers comprise, respectively, the fifth and sixth inclined surfaces.

15. The system of claim 14, wherein:

the fifth and sixth fingers include, respectively, fifth and sixth lateral contact surfaces;

the fifth lateral contact surface is arranged to contact the first side of the deformable object; and the sixth lateral contact surface is arranged to contact the second side of the deformable object.

16. The system of claim 15, wherein:

the fifth and sixth lateral contact surfaces are at a fixed angle with respect to the fifth and sixth inclined surfaces, respectively;

the fifth and sixth fingers are biased toward a lower rotational position; and when the third pair of opposing arms exerts a compressive force on the deformable object, contact between the fifth contact surface and the first side of the deformable object and contact between the sixth contact surface and the second side of the deformable object cause the fifth and sixth fingers to be rotated toward a higher rotational position.

17. The system of claim 16, wherein rotation of the fifth and sixth fingers from the lower rotational position toward the higher rotational position causes the fifth and sixth fingers to exert a lifting force on the deformable object.

18. The system of claim 1, wherein the fluid power driver is a pneumatic cylinder and the fluid power system is a gas power system.

19. A system for lifting a deformable object from a surface, the system comprising:

a support structure;

a first arm structure and a second arm structure;

a plurality of first inclined surfaces coupled to the first arm structure, wherein each of the first inclined surfaces in the plurality of first inclined surfaces is configured to contact a first side of the deformable object;

a plurality of second inclined surfaces coupled to the second arm structure, wherein each of the second inclined surfaces in the plurality of second inclined surfaces is configured to contact a second side of the deformable object; and a fluid power driver operatively coupled in parallel to the plurality of first inclined surfaces and the plurality of first inclined surfaces via a fluid power system;

wherein, when the support structure is positioned above the deformable object on the surface, the fluid power driver is configured to increase pressure in the fluid power system until the pressure in the fluid power system reaches a predetermined level such that:

each of the first inclined surfaces in the plurality of first inclined surface independently move a distance until the first inclined surfaces in the plurality of first inclined surface are in contact with the first side of the deformable object and the second inclined surfaces in the plurality of second inclined surface independently move a distance until the second inclined surfaces in the plurality of second inclined surface are in contact with the second side of the deformable object, and the plurality of first inclined surface and the plurality of second inclined surface exert a compressive force on the deformable object that causes the deformable object to slide up one or more of the first and second inclined surfaces to lift the deformable object off of the surface.

20. A method of lifting a deformable object from a surface, the method comprising:

positioning a support structure and a deformable object with respect to each other such that the support structure is above the deformable object, wherein the support structure is coupled to:

first, second, third, and fourth arms, wherein the first and second arms define a first pair of opposing arms and the third and fourth arms define a second pair of opposing arms, first, second, third, and fourth inclined surfaces located, respectively, on the first, second, third, and fourth arms, wherein each of the first, second, third, and fourth inclined surfaces is configured to contact the deformable object, and a fluid power driver operatively coupled in parallel to the first and second pairs of opposing arms via a fluid power system;

when the support structure is positioned above the deformable object on the surface, increasing, by the fluid power driver, pressure in the fluid power system until the pressure in the fluid power system reaches a predetermined level such that:

each of the first and second pairs of opposing arms independently closes a distance until the first and third inclined surfaces are in contact with a first side of the deformable object and the second and fourth inclined surfaces are in contact with a second side of the deformable object, and the first and second pairs of opposing arms exert a compressive force on the deformable object that causes the deformable object to slide up one or more 5 of the first, second, third, and fourth inclined surfaces to lift the deformable object off of the surface.

* * * * *